(12) United States Patent
Lee

(10) Patent No.: US 10,963,160 B2
(45) Date of Patent: Mar. 30, 2021

(54) APPARATUS AND METHOD FOR CHECKING VALID DATA IN BLOCK CAPABLE OF STORING LARGE VOLUME DATA IN MEMORY SYSTEM

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/450,185

(22) Filed: Jun. 24, 2019

(65) Prior Publication Data

US 2020/0057562 A1 Feb. 20, 2020

(30) Foreign Application Priority Data

Aug. 14, 2018 (KR) ........................ 10-2018-0094934

(51) Int. Cl.
*G06F 12/00* (2006.01)
*G06F 3/06* (2006.01)
*G06F 11/16* (2006.01)
*G06F 12/02* (2006.01)
*G06F 13/00* (2006.01)
*G06F 13/28* (2006.01)

(52) U.S. Cl.
CPC ........ *G06F 3/0604* (2013.01); *G06F 11/1666* (2013.01); *G06F 12/0246* (2013.01); *G06F 2212/7201* (2013.01); *G06F 2212/7205* (2013.01); *G06F 2212/7209* (2013.01)

(58) Field of Classification Search
CPC ............... G06F 3/0604; G06F 11/1666; G06F 2212/7201; G06F 2212/7209; G06F 2212/7205
See application file for complete search history.

(56) References Cited

U.S. PATENT DOCUMENTS

| 9,190,155 | B2 * | 11/2015 | Lee | G11C 16/16 |
| 9,354,955 | B1 * | 5/2016 | Jones | G06F 12/00 |
| 2011/0055455 | A1 * | 3/2011 | Post | G06F 12/0246 |
| | | | | 711/103 |
| 2016/0267004 | A1 * | 9/2016 | Perlstein | G06F 12/0253 |

FOREIGN PATENT DOCUMENTS

| KR | 10-2015-0013235 | 2/2015 |
| KR | 10-2016-0110596 | 9/2016 |

\* cited by examiner

*Primary Examiner* — Mark A Giardino, Jr.
(74) *Attorney, Agent, or Firm* — IP & T Group LLP

(57) ABSTRACT

A memory system includes a memory device including plural memory blocks storing a data, and a controller configured to divide a memory block into plural logical unit blocks, compare a valid page count of the memory block with a map data count of each logical unit block sequentially, and determine data validity of each logical unit block for a garbage collection operation based on a comparison result.

18 Claims, 15 Drawing Sheets

APPARATUS AND METHOD FOR CHECKING VALID DATA IN BLOCK CAPABLE OF STORING LARGE VOLUME DATA IN MEMORY SYSTEM

CROSS-REFERENCE TO RELATED APPLICATION

This patent application claims priority under 35 U.S.C. § 119(a) to Korean Patent Application No. 10-2018-0094934, filed on Aug. 14, 2018, the entire disclosure of which is incorporated herein by reference.

TECHNICAL FIELD

Various embodiments of the invention relate to a memory system, and more particularly, to an apparatus and a method for determining a victim block for garbage collection by using a valid data count in a memory block, which is capable of storing a large amount of data, included in a nonvolatile memory device.

BACKGROUND

Recently, paradigm for computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a USB (Universal Serial Bus) memory device, a memory card having various interfaces, a solid state drive (SSD) or the like.

SUMMARY

Embodiments of the disclosure can provide a memory system, a data processing system, and an operation process or a method, which can quickly and reliably process data into a memory device by reducing operational complexity and performance degradation of the memory system, thereby enhancing usage efficiency of the memory device.

Embodiments of the disclosure can provide an apparatus and a method which is capable of simplifying a procedure for selecting and determining a block storing invalid data, among data storage blocks, in order to release the block to become a free block. It is possible to provide a method and apparatus that can reduce a time required to select and determine which block is a block storing invalid data.

In an embodiment, there is provided a control method for dividing a block into a plurality of logical unit blocks, which has increased data storage capacity in a large capacity memory device, to manage the block. When it is determined that the block cannot be programmed further, the memory system can compare the number of physical addresses of each logical unit block with a valid data count of the block and performing an operation for verifying data validity when a ratio of valid data is in a set range and determining the block as a target of garbage collection when the ratio is outside of the set range.

In addition, an embodiment can provide an apparatus and a method for dividing a block into a plurality of logical unit blocks, which has increased data storage capacity in a large-capacity memory device, and sequentially compares a valid page count (VPC) of the block with a map data count of each logical unit block, so as to reduce a time required to recognize valid data during garbage collection.

In an embodiment, a memory system can include a memory device including plural memory blocks storing a data; and a controller configured to divide a memory block into plural logical unit blocks, compare a valid page count of the memory block with a map data count of each logical unit block sequentially, and determine data validity of each logical unit block for a garbage collection operation based on a comparison result.

By the way of example but not limitation, the controller can determine that data stored in at least one logical unit block subsequent to a select logical unit block of the logical unit blocks is invalid when the valid page count is less than the map data count of the select logical unit block. Further, the controller is configured to perform a validity check operation against data stored in the select logical unit block.

For example, the controller is configured to subtract the map data count of the select logical unit block from the valid page count, when the valid page count is greater than the map data count of the select logical block, and compare a subtracted valid page count with a map data count of another logical unit block followed by the select logical unit block. The controller can be configured to perform a validity check operation against data stored in the another logical unit block.

The controller can be configured to determine that all data stored in the select logical unit block is valid when the valid page count is equal to the map data count and determine that data stored in at least one logical unit block subsequent to the select logical unit block is invalid.

For example, the map data count can be determined on a logical unit block by logical unit block basis, and the number of map data for associating a physical address with a logical address.

The memory block including at least two logical unit blocks is a distinct group of memory cells that are erasable together as a unit, and the logical unit block is identified by a set number of map data each assigned to a distinct group of memory cells that are programmable together as a unit.

The controller is configured to compare the valid page count with a total number of map data of the plural logical unit blocks when the memory block is not programmable without an erase operation. The controller is configured to select at least one memory block having the largest difference between a valid page count and a total number of map data thereof, among the plural memory blocks, and check validity of map data stored in selected memory block.

For example, the controller can be configured to preferentially designate a memory block among the plural memory blocks as a victim block for the garbage collection operation, the designated memory block having a lowest ratio of a total number of valid map data of plural logical unit blocks therein to a number of pages in the designated memory block.

In another embodiment, a method for operating a memory system can include dividing each of plural memory blocks storing a data into plural logical unit blocks; determining whether to perform a garbage collection operation when at least one memory block of the plural memory blocks is not programmable without an erase operation; comparing a valid page count of the memory block with a map data count of each logical unit block of the memory block sequentially; and determining data validity of each logical unit block for a garbage collection operation based on a comparison result.

The comparing the valid page count can include comparing the valid page count with the map data count of a logical unit block sequentially selected among the plural logical unit blocks.

The determining of the data validity can include, when the valid page count is less than the map data count of the selected logical block unit, determining that data stored in at least one logical unit block subsequent to the selected logical unit block is invalid; and performing a validity check operation against data stored in the selected logical unit block.

The determining of the data validity can include, when the valid page count is greater than the map data count of the selected logical unit block, subtracting the map data count of the selected logical unit block from the valid page count; and determining that data stored in the selected logical unit block is valid.

The determining of the data validity can include: comparing a subtracted valid page count with a map data count of another logical unit block sequentially following the selected logical unit block; and performing a validity check operation against data stored in the another logical unit block when the subtracted valid page count is less than the map data count of the another logical unit block.

The determining of the data validity can include, when the valid page count is equal to the map data count of the selected logical unit block, determining that all data stored in the selected logical unit block is valid; and determining that data stored in at least one logical unit block subsequent to the selected logical unit block is invalid.

The determining whether to perform a garbage collection operation can include comparing a valid page count and a total number of map data regarding each memory block; selecting at least one memory block having the largest difference between the valid page count and the total number of map data thereof; and checking a validity of map data stored in selected memory block.

The determining whether to perform a garbage collection operation can include preferentially designating a memory block among the plural memory blocks as a victim block for the garbage collection operation, the designated memory block having a lowest ratio of a total number of valid map data of plural logical unit blocks therein to a number of page in the designated memory block.

In another embodiment, an apparatus is provided for controlling a memory system including at least one processor and at least one memory including computer program code. The at least one memory and the computer program code are configured, with the at least one processor, to cause the apparatus to divide each of plural memory blocks storing a data into plural logical unit blocks; determine whether to perform a garbage collection operation when at least one memory block of the plural memory blocks is not programmable without an erase operation; compare a valid page count of the memory block with a map data count of each logical unit block of the memory block sequentially; and determine data validity of each logical unit block for a garbage collection operation based on a comparison result.

In another embodiment, a memory system can include a nonvolatile memory device including a physical block comprised of a plurality of sequenced logical blocks; and a controller configured to: control the nonvolatile memory device to sequentially program data into physical pages within the physical block; and determine, as invalid, data corresponding to a subsequent logical block, among the logical blocks, when a number of valid map data of a current logical block, among the logical blocks, is greater than or equal to a remaining valid page count of the physical block, wherein the remaining valid page count is a total valid page count of the physical block minus a number of valid map data of one or more previous logical blocks, and wherein the valid map data represents the physical pages and the logical pages validly mapped to each other.

BRIEF DESCRIPTION OF THE DRAWINGS

The description herein makes reference to the accompanying drawings wherein like reference numerals refer to like parts throughout the figures, and wherein.

DETAILED DESCRIPTION

Figure 1:
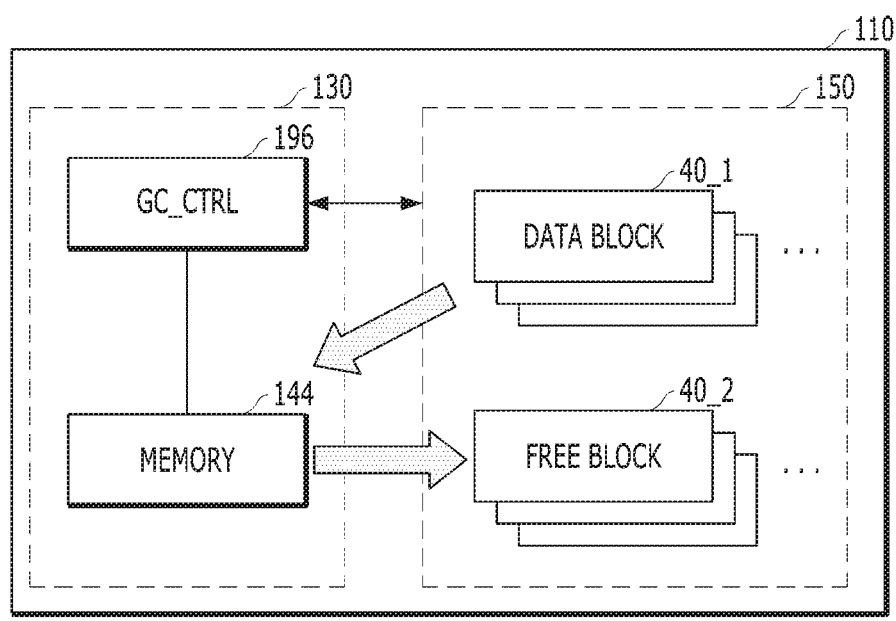
FIG. 1 illustrates garbage collection in a memory system in accordance with an embodiment of the disclosure.

Various embodiments of the disclosure are described below in more detail with reference to the accompanying drawings. Elements and features of the disclosure, however, may be configured or arranged differently to form other embodiments, which may be variations of any of the disclosed embodiments. Thus, the present invention is not limited to the embodiments set forth herein. Rather, the described embodiments are provided so that this disclosure is thorough and complete and fully conveys the scope of the disclosure to those skilled in the art to which this invention pertains. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure will now be described in detail with reference to the accompanying drawings, wherein like numbers reference like elements.

In FIG. 1, a memory system 10 in accordance with an embodiment of the disclosure is described. The memory system 110 can include a controller 130 and a memory device 150. The memory system 110 may be engaged with another device, e.g., a computing device.

Figure 2:
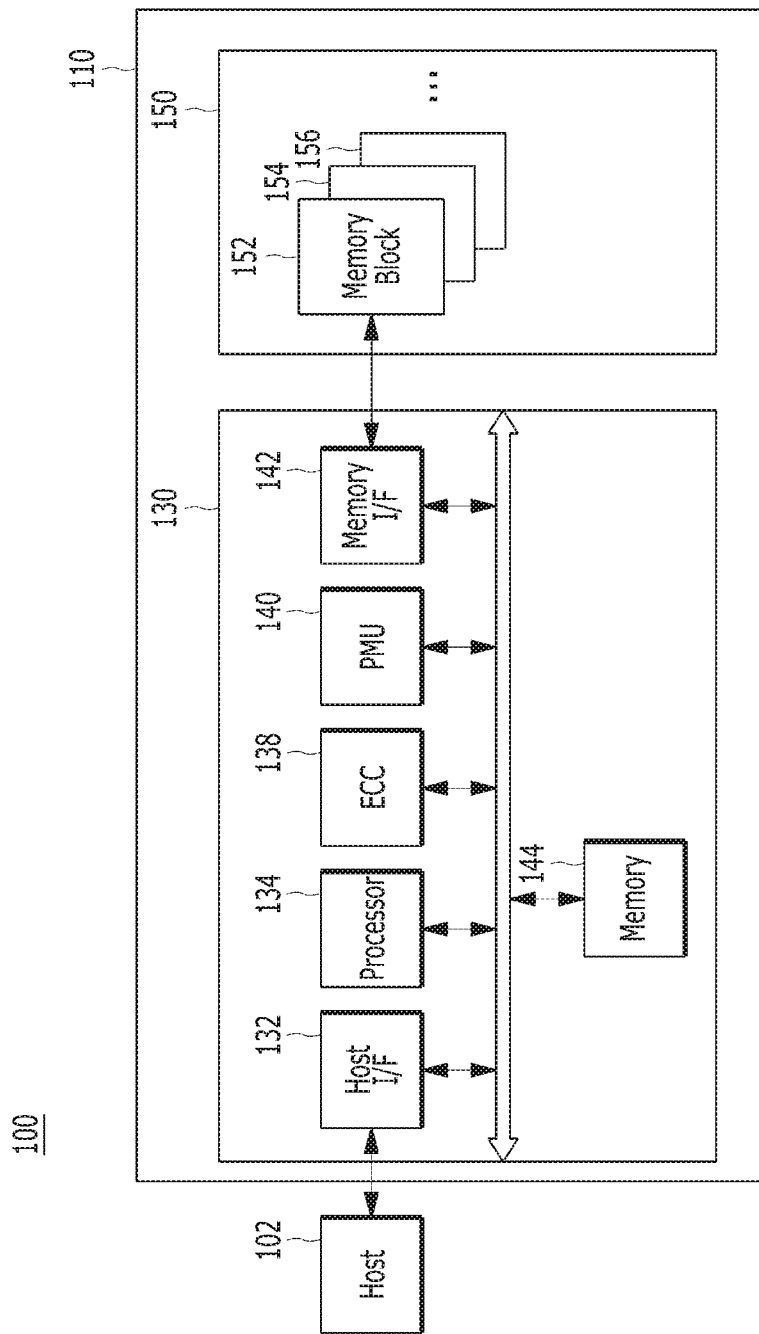
FIG. 2 shows a data processing system including a memory system in accordance with an embodiment of the disclosure.

Referring to FIG. 1, garbage collection (GC) can be performed by the memory system itself without commands or instructions transmitted from a host 102 (see, FIG. 2). The controller 130 in the memory system 110 can read user data from the plurality of data blocks 40_1 of the memory device 150, temporarily store the user data in the memory 144 disposed within, or directly engaged with and controlled by, the controller 130, and program the user data loaded in the memory 144 into the free block 40_2 of the memory device 150. Here, the plurality of data blocks 40_1 may include blocks that can no longer be programmed with new data without an erase.

Specifically, the garbage collection control circuitry 196 included in the controller 130 can select at least one of the plurality of data blocks 40_1 in the memory device 150 as a victim block. In addition, the garbage collection control circuitry 196 searches for and extracts valid data in a memory block selected as a victim block, and moves valid data to the free block 40_2 as a target block. Data determined to be no longer valid in at least one victim block among the plurality of data blocks 40_1 in the memory device 150 may be discarded (i.e., it may not be moved to the free block 40_2). When the valid data stored in the specific block 40_1 in the memory device 150 is moved to the free block 40_2, the controller 130 considers that the specific block 40_1 has no more valid data. Thereafter, when it is necessary to program new data in the specific block 40_1, all the data stored in the corresponding block 40_1 can be erased.

As used in the disclosure, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

According to an embodiment, the controller 130 can use the memory 144 to temporarily store valid data recognized and selected for the garbage collection operation until the valid data is programmed into the free block 40_2.

For achieving garbage collection, the controller 130 should distinguish valid data from invalid data which are stored in the plurality of data blocks 40_1. The information regarding a valid page count (VPC) corresponding to each data block 40_1 indicates how much valid data (e.g. the number of valid pages) are stored in each data block 40_1, but may not indicate which data or which page is valid. Therefore, the controller 130 may be required to determine which data (or which page) is valid based at least on the valid page count as well as other operation information such as metadata or map data associated with data stored in the corresponding memory block. If valid data to be transferred or stored into the free block 40_2 for the garbage collection operation can be easily distinguished, resources (e.g., time and power) can be reduced.

The plurality of memory blocks 40_1, 40_2 inside the memory device 150 can store large volume data. The controller 130 may divide a memory block into a plurality of logical unit blocks in order to more efficiently control and manage the plurality of memory blocks 40_1, 40_2 capable of storing large amounts of data. When a single memory block is divided into a plurality of logical unit blocks, the controller 130 can generate or manage map data (e.g., L2P table, P2L table) for each logical unit block.

According to embodiments, there are different ways to divide a single memory block into several logical unit blocks. For example, a block may be divided into several logical unit blocks based on structure of the memory device 150, size of the map data, and/or position of the map data. Each memory block in the memory device 150 can program data in a plurality of page units. The size of data that can be stored in each page can be changed according to a structure of a memory cell included in each memory block. For an example, when the map data is created in a bitmap format, an area corresponding to one or more times of the map data can be determined as a size of the logical unit block. By way of example but not limitation, the memory block can include at least two logical unit blocks. The memory block can be a distinct group of memory cells that are erasable together as a unit. The logical unit block can be identified by a set number of map data each assigned to a distinct group of memory cells that are programmable together as a unit.

Data can be sequentially programmed from the first page to the last page in the data block 40_1. When data is programmed on the last page of a memory block, the memory block is closed, that is, in a closed state, indicating that no new data can be programmed into the block. When a specific block among the data blocks 40_1 is in a closed state, the garbage collection control circuitry 196 can sequentially compare the number of map data corresponding to data stored in each logical unit block with a valid page count in the corresponding block to determine validity of the data.

When the data block 40_1 in the memory device 150 becomes closed such that data can no longer be written without an erase operation, the controller 130 can compare a valid page count with a total number of map data regarding a plurality of logical unit blocks. When the valid page count and the total number of the map data do not match (i.e., are not equal to each other) in a specific block, it can be estimated that at least one unnecessary or invalid map data is included in the corresponding block. The controller 130 can check whether the map data corresponding to data stored in the memory block is valid. If there is map data that is no longer valid, the controller 130 may delete, nullify or invalidate the invalid map data so that map data can be updated.

On the other hand, the garbage collection control circuitry 196 can determine whether to designate a specific block as a victim block for garbage collection based at least on a ratio of the sum of map data of a plurality of logical unit blocks in a specific block divided by a total number of pages in the corresponding block. The number of pages in a memory block is a fixed value determined during the design and manufacture of the memory device 150. The number of pages may represent the maximum amount of valid data that can be stored in a single memory block. When a specific block is divided into a plurality of logical unit blocks and map data is associated with each item of data stored in the logical unit block, the sum of the map data of plural logical unit blocks in the corresponding block can indicate the amount of data, which is currently valid, in the corresponding block. The garbage collection control circuitry 196 can recognize the amount of valid data in each block based on a ratio of the sum of the map data of plural logical unit blocks in one memory block divided by the valid page count pages of the corresponding block. As a ratio of a specific block is lower, the garbage collection control circuitry 196 can preferentially determine that block as a victim block for the garbage collection operation. In addition, the garbage collection control circuitry 196 can determine whether to select a victim block for the garbage collection operation based at least on whether the above-mentioned ratio is within a set range.

In FIG. 2, a data processing system 100 in accordance with an embodiment of the disclosure is described. Referring to FIG. 2, the data processing system 100 may include a host 102 engaged or interlocked with a memory system 110.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By the way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described later, in reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By the way of example but not limitation, the controller 130 and the memory device 150 may be integrated into a single semiconductor device. The controller 130 and memory device 150 may be so integrated into an SSD for improving an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through a firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include and all circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 exemplifies the second memory 144 disposed within the controller 130, the invention is not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling and the like. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programmed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation of copying and storing data stored in a memory block among the memory blocks 152, 154, 156 in the memory device 150 to another memory block, e.g., a garbage collection (GC) operation. The background operation can include an operation of moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In accordance with an embodiment, the controller 130 and the second memory 144 shown in FIG. 1 may be implemented through at least one processor 134 and at least one memory 144 in the controller 130 described in FIG. 2. For example, the search circuitry 32 and the search control circuitry 34 shown in FIG. 1 can be implemented with at least one processor 134 and at least one memory 144 in the controller 130 described in FIG. 2.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By the way of example but not limitation, the controller 130 can recognize statuses regarding a plurality of channels (or ways) associated with a plurality of memory dies included in the memory device 150. The controller 130 may determine the state of each channel or each way as one of a busy state, a ready state, an active state, an idle state, a normal state and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
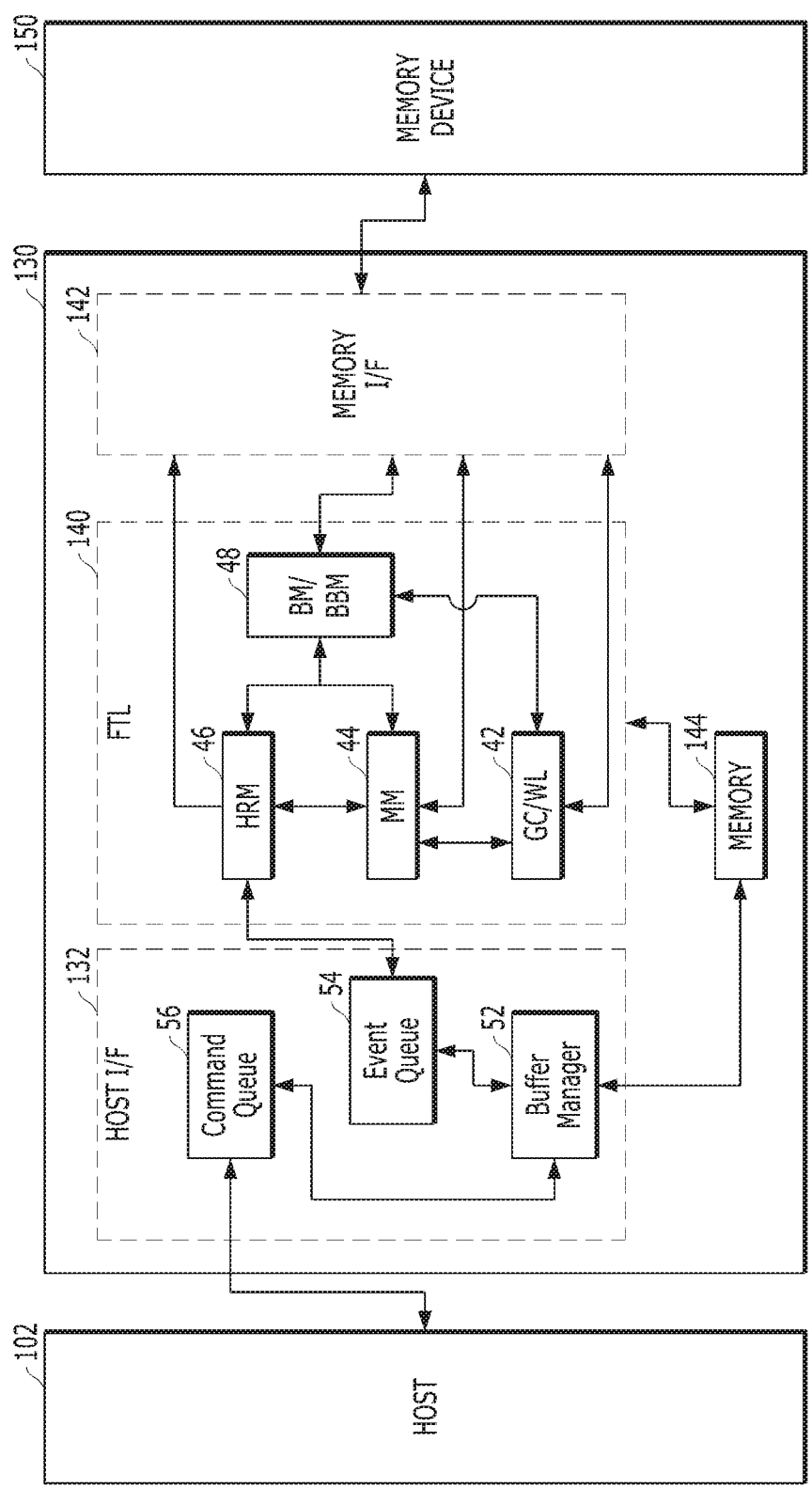
FIG. 3 illustrates a memory system in accordance with an embodiment of the disclosure.

Referring to FIG. 3, a controller in a memory system in accordance with another embodiment of the disclosure is described in detail. The controller 130 cooperates with the host 102 and the memory device 150. As illustrated, the controller 130 includes a host interface 132, a flash translation layer (FTL) 140, as well as the host interface 132, the memory interface 142 and the memory 144 previously identified in connection with FIG. 2.

Although not shown in FIG. 3, in accordance with an embodiment, the ECC component 138 described in FIG. 2 may be included in the FTL 140. In another embodiment, the ECC component 138 may be implemented as a separate module, a circuit, a firmware or the like, which is included in, or associated with, the controller 130.

The host interface 132 is for handling commands, data, and the like transmitted from the host 102. By way of example but not limitation, the host interface 132 can include a command queue 56, a buffer manager 52 and an event queue 54. The command queue 56 can sequentially store commands, data, and the like transmitted from the host 102 and output them to the buffer manager 52 in a stored order. The buffer manager 52 can classify, manage or adjust the commands, the data, and the like, which are delivered from the command queue 56. The event queue 54 can sequentially transmit events for processing the commands, the data, and the like transmitted from the buffer manager 52.

A plurality of commands or data of the same characteristic may be continuously transmitted from the host 102, or commands and data of different characteristics may be transmitted to the memory system 110 after being mixed or jumbled. For example, a plurality of commands for reading data (read commands) may be delivered, or commands for reading data (read command) and programming/writing data (write command) may be alternately transmitted to the memory system 110. The host interface 132 can store commands, data, and the like, which are transmitted from the host 102, to the command queue 56 sequentially. Thereafter, the host interface 132 can estimate or predict what kind of operation the controller 130 will perform according to the characteristics of the command, data, and other relevant information which is transmitted from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like to the FTL 140. The event queue 54 receives events, entered from the buffer manager 52, which are to be internally executed and processed by the memory system 110 or the controller 130 in response to the commands, the data, and the like transmitted from the host 102, so as to deliver the events to the FTL 140 in the order received.

In accordance with an embodiment, the host interface 132 described in FIG. 3 may perform the functions of the controller 130 described in FIG. 1. The host interface 132 may set the first memory 104 in the host 102 as a slave and add the first memory 104 as an additional storage space which is controllable or usable by the controller 130.

In accordance with an embodiment, the FTL 140 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection or wear leveling. The block manager 48 can execute commands or instructions on a block in the memory device 150.

By the way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map manager (MM) 44, to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program entered data to a specific page of the unrecorded (no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. It can be plausible that the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least valid page when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 may not perform the mapping table update. It is because the map request is issued with old physical information if the status manger 42 requests a map update and a valid page copy is completed later. The map manager 44 may perform a map update operation to ensure accuracy only if the latest map table still points to the old physical address.

In accordance with an embodiment, the state manager 42 can include the garbage collection control circuitry 196 shown in FIG. 1.

The memory device 150 can include a plurality of memory blocks. The plurality of memory blocks can be classified into different types of memory blocks such as a single level cell (SLC) memory block, a multi level cell (MLC) Cell) memory block or the like, according to the number of bits that can be stored or represented in one memory cell of the block. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity in the same space than the SLC memory block. The MLC memory block can be highly integrated in terms of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory or a NOR flash memory. But, in another embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
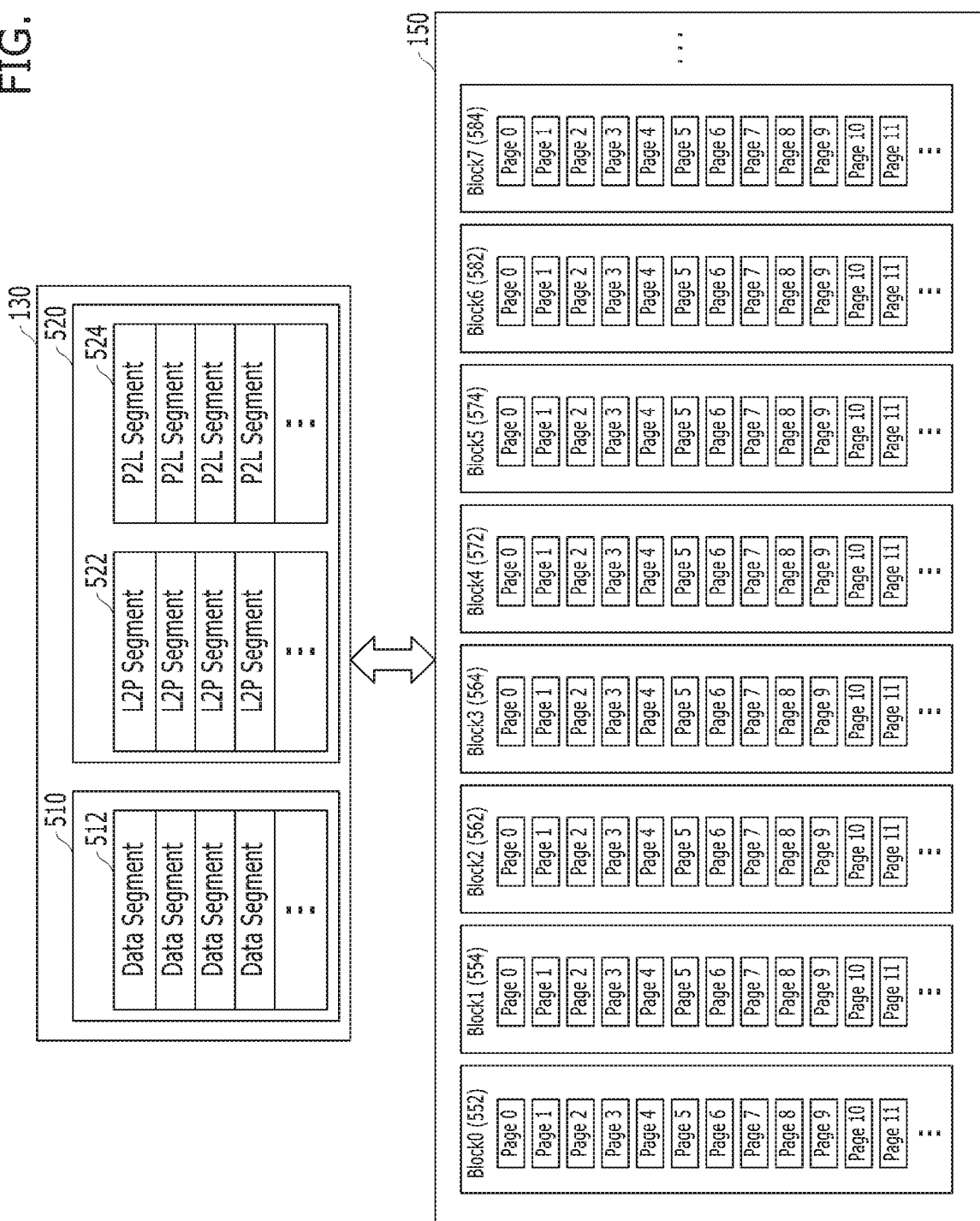
FIGS. 4 and 5 show a memory system which performs a plurality of command operations corresponding to a plurality of commands, in accordance with an embodiment of the disclosure.
Figure 5:
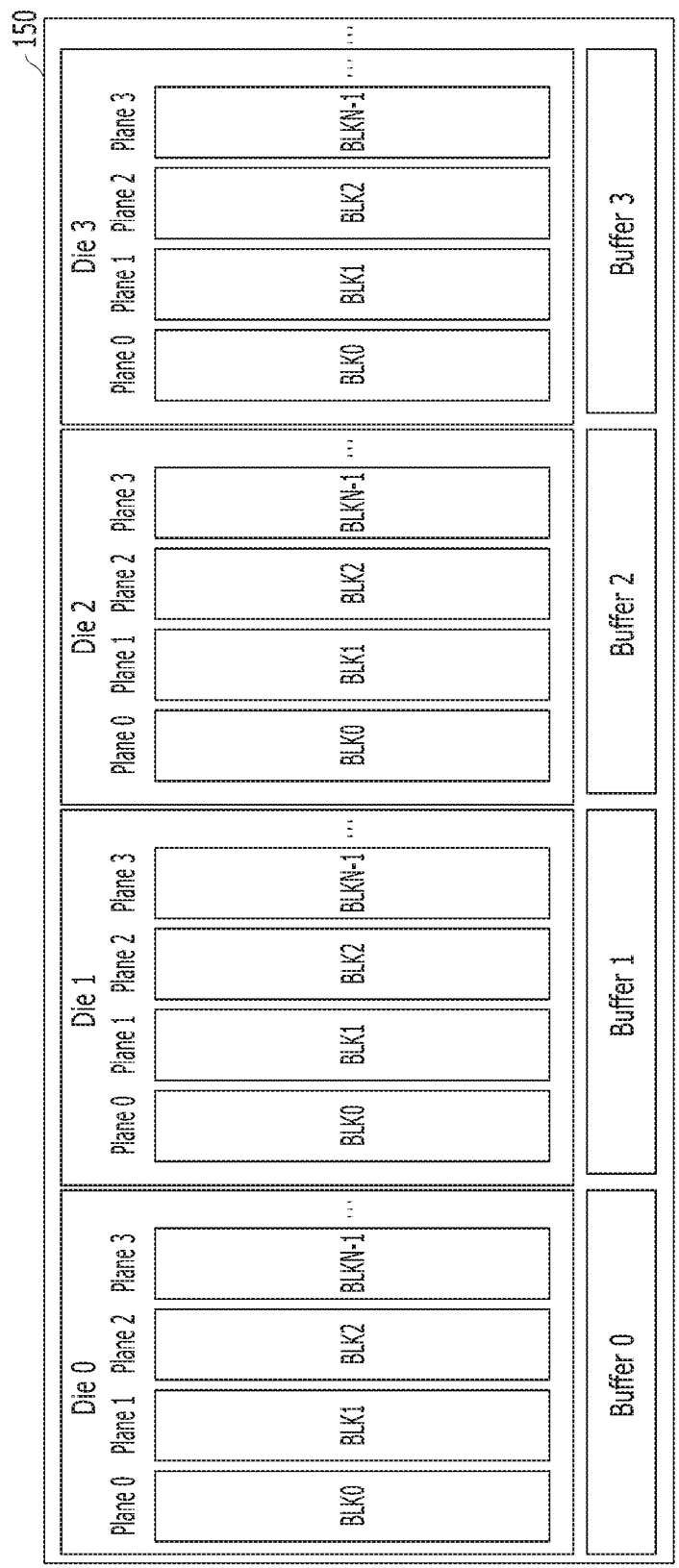

FIGS. 4 and 5 schematically illustrate performing a plurality of command operations corresponding to a plurality of commands in the memory system in accordance with an embodiment of the disclosure. A data processing operation is described in the context of a case where a plurality of write commands are received from the host 102 and program operations corresponding to the write commands are performed, another case where a plurality of read commands are received from the host 102 and read operations corresponding to the read commands are performed, another case where a plurality of erase commands are received from the host 102 and erase operations corresponding to the erase commands are performed, and another case where a plurality of write commands and a plurality of read commands are received together from the host 102 and program operations and read operations corresponding to the write commands and the read commands are performed.

Moreover, in an embodiment of the disclosure, write data corresponding to a plurality of write commands entered from the host 102 are stored in the buffer/cache in the memory 144 of the controller 130, the write data stored in the buffer/cache are programmed to and stored in the plurality of memory blocks in the memory device 150, map data are updated in correspondence to the stored write data in the plurality of memory blocks, and the updated map data are stored in the plurality of memory blocks. In an embodiment of the disclosure, program operations corresponding to a plurality of write commands entered from the host 102 are performed. Furthermore, in an embodiment of the disclosure, a plurality of read commands are entered from the host 102 for the data stored in the memory device 150, data corresponding to the read commands are read from the memory device 150 by checking the map data of the data corresponding to the read commands, the read data are stored in the buffer/cache in the memory 144 of the controller 130, and the data stored in the buffer/cache are provided to the host 102. In other words, according to an embodiment of the disclosure, a case is described where read operations corresponding to a plurality of read commands entered from the host 102 are performed. In addition, according to an embodiment of the disclosure, a case is described where: a plurality of erase commands are received from the host 102 for the memory blocks in the memory device 150, memory blocks are checked corresponding to the erase commands, the data stored in the checked memory blocks are erased, map data are updated corresponding to the erased data, and the updated map data are stored in the plurality of memory blocks included in the memory device 150. More generally, a case is described where erase operations corresponding to a plurality of erase commands received from the host 102 are performed.

Further, while the description below is given in the context that the controller 130 performs command operations in the memory system 110, it is to be noted that, as described above, the processor 134 in the controller 130 may perform command operations in the memory system 110, through, for example, an FTL. Also, in an embodiment of the disclosure, the controller 130 programs and stores user data and metadata, corresponding to write commands entered from the host 102, in memory blocks among the plurality of memory blocks in the memory device 150, reads user data and metadata corresponding to read commands received from the host 102, from memory blocks among the plurality of memory blocks, and provides the read data to the host 102, or erases user data and metadata, corresponding to erase commands entered from the host 102, from memory blocks among the plurality of memory blocks.

Metadata may include first map data including logical/physical (L2P: logical to physical) information (logical information) and second map data including physical/logical (P2L: physical to logical) information (physical information), for data stored in memory blocks corresponding to a program operation. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all remaining information and data excluding user data corresponding to a command received from the host 102.

That is, in an embodiment of the disclosure, in the case where the controller 130 receives a plurality of write commands from the host 102, program operations corresponding to the write commands are performed, and user data corresponding to the write commands are written and stored in empty memory blocks, open memory blocks or free memory blocks for which an erase operation has been performed, among the memory blocks of the memory device 150. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks among the memory blocks of the memory device 150.

Here, in the case where write commands are entered from the host 102, the controller 130 writes and stores user data corresponding to the write commands in memory blocks. The controller 130 stores, in other memory blocks, metadata including first map data and second map data for the user data stored in the memory blocks. Particularly, corresponding to the data segments of the user data which are stored in the memory blocks of the memory device 150, the controller 130 generates and updates the L2P segments of first map data, and the P2L segments of second map data as the map segments of map data among the meta segments of metadata. The controller 130 stores the map segments in the memory blocks of the memory device 150. The map segments stored in the memory blocks are loaded in the memory 144 included in the controller 130 and are then updated.

Further, in the case where a plurality of read commands are received from the host 102, the controller 130 reads read data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In addition, in the case where a plurality of erase commands are received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache included in the memory 144 of the controller 130, and then stores the data, that is, the metadata and the user data, in the memory device 150. Herein, by the way of example but not limitation, the background operation may include a garbage collection operation or a read reclaim operation as a copy operation, a wear leveling operation as a swap operation or a map flush operation, For instance, for the background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, and then store the metadata and user data, in certain other memory blocks of the memory device 150.

In the memory system in accordance with an embodiment of the disclosure, in the case of performing command operations as foreground operations, and a copy operation, a swap operation and a map flush operation as background operations, the controller 130 schedules queues corresponding to the foreground operations and the background operations, and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in accordance with an embodiment of the disclosure, identifiers are assigned not only by respective operations for the memory device 150 but also by functions for the memory device 150, and queues corresponding to the functions assigned with respective identifiers are scheduled.

In the memory system in accordance with an embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system in accordance with an embodiment of the disclosure, after memory regions corresponding to the queues scheduled by identifiers are allocated to the memory 144 included in the controller 130 and the memory included in the host 102, the controller 130 manages addresses for the allocated memory regions. The controller 130 performs not only the foreground operation and the background operation but also respective functions and operations in the memory device 150, by using the scheduled queues.

Referring to FIG. 4, the controller 130 performs command operations corresponding to a plurality of commands entered from the host 102, for example, program operations corresponding to a plurality of write commands entered from the host 102. The controller 130 programs and stores user data corresponding to the write commands, in memory blocks of the memory device 150. Also, corresponding to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages included in the memory blocks of the memory device 150. That is, the controller 130 generates and updates L2P segments as the logical segments of the first map data and P2L segments as the physical segments of the second map data, and then stores the logical and physical segments in pages included in the memory blocks of the memory device 150.

For example, the controller 130 caches and buffers the user data corresponding to the write commands entered from the host 102, in a first buffer 510 included in the memory 144 of the controller 130. Particularly, after storing data segments 512 of the user data in the first buffer 510 worked as a data buffer/cache, the controller 130 stores the data segments 512 stored in the first buffer 510 in pages included in the memory blocks of the memory device 150. As the data segments 512 of the user data corresponding to the write commands received from the host 102 are programmed to and stored in the pages included in the memory blocks of the memory device 150, the controller 130 generates and updates the first map data and the second map data. The controller 130 stores the first and second map data in a second buffer 520 included in the memory 144 of the controller 130. Particularly, the controller 130 stores L2P segments 522 of the first map data and P2L segments 524 of the second map data for the user data, in the second buffer 520 as a map buffer/cache. As described above, the L2P segments 522 of the first map data and the P2L segments 524 of the second map data may be stored in the second buffer 520 of the memory 144 in the controller 130. A map list for the L2P segments 522 of the first map data and another map list for the P2L segments 524 of the second map data may be stored in the second buffer 520. The controller 130 stores the L2P segments 522 of the first map data and the P2L segments 524 of the second map data, which are stored in the second buffer 520, in pages included in the memory blocks of the memory device 150.

Moreover, the controller 130 performs command operations corresponding to a plurality of commands received from the host 102, for example, read operations corresponding to a plurality of read commands received from the host 102. Particularly, the controller 130 loads L2P segments 522 of first map data and P2L segments 524 of second map data as the map segments of user data corresponding to the read commands, in the second buffer 520, and checks the L2P segments 522 and the P2L segments 524. Then, the controller 130 reads the user data stored in pages of corresponding memory blocks among the memory blocks of the memory device 150, stores data segments 512 of the read user data in the first buffer 510, and then provides the data segments 512 to the host 102.

Furthermore, the controller 130 performs command operations corresponding to a plurality of commands entered from the host 102, for example, erase operations corresponding to a plurality of erase commands entered from the host 102. In particular, the controller 130 checks memory blocks corresponding to the erase commands among the memory blocks of the memory device 150 to carry out the erase operations for the checked memory blocks.

In the case of performing an operation of copying data or swapping data among the memory blocks included in the memory device 150, for example, a garbage collection operation, a read reclaim operation or a wear leveling operation, as a background operation, the controller 130 stores data segments 512 of corresponding user data, in the first buffer 510, loads map segments 522, 524 of map data corresponding to the user data, in the second buffer 520, and then performs the garbage collection operation, the read reclaim operation or the wear leveling operation. In the case of performing a map update operation and a map flush operation for metadata, e.g., map data, for the memory blocks of the memory device 150 as a background operation, the controller 130 loads the corresponding map segments 522, 524 in the second buffer 520, and then performs the map update operation and the map flush operation.

As aforementioned, in the case of performing functions and operations including a foreground operation and a background operation for the memory device 150, the controller 130 assigns identifiers by the functions and operations to be performed for the memory device 150. The controller 130 schedules queues respectively corresponding to the functions and operations assigned with the identifiers, respectively. The controller 130 allocates memory regions corresponding to the respective queues, to the memory 144 included in the controller 130 and the memory included in the host 102. The controller 130 manages the identifiers assigned to the respective functions and operations, the queues scheduled for the respective identifiers and the memory regions allocated to the memory 144 of the controller 130 and the memory of the host 102 corresponding to the queues, respectively. The controller 130 performs the functions and operations for the memory device 150, through the memory regions allocated to the memory 144 of the controller 130 and the memory of the host 102.

Referring to FIG. 5, the memory device 150 includes a plurality of memory dies, for example, a memory die 0, a memory die 1, a memory die 2 and a memory die 3, and each of the memory dies includes a plurality of planes, for example, a plane 0, a plane 1, a plane 2 and a plane 3. The respective planes in the memory dies include a plurality of memory blocks, for example, N blocks Block0, Block1, . . . , BlockN−1, each including a plurality of pages, for example, $2^M$ number of pages, as described above with reference to FIG. 3. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers included in the memory device 150. For example, in the case of performing program operations, data corresponding to the program operations are stored in the buffers, and are then stored in the pages of the memory dies. In the case of performing read operations, data corresponding to the read operations are read from the pages in the memory blocks of the memory dies, are stored in the buffers, and are then provided to the host 102 through the controller 130.

Although it is described below that the buffers in the memory device 150 are disposed outside the respective corresponding memory dies, it is noted that the buffers may be disposed within the respective corresponding memory dies, and further noted that the buffers may correspond to the respective planes or the respective memory blocks in the respective memory dies. Also, while it is described below that the buffers in the memory device 150 are page buffers 322, 324 and 326 as described above with reference to FIG. 3, it is noted that the buffers may be a plurality of caches or a plurality of registers in the memory device 150.

Also, the plurality of memory blocks in the memory device 150 may be grouped into a plurality of super memory blocks, and command operations may be performed in the plurality of super memory blocks. Each of the super memory blocks may include a group of memory blocks, for example, memory blocks in a first memory block group may form a first super block and memory blocks in a second memory block group may form a second super block. In this regard, when the first memory block group is included in the first plane of a certain first memory die, the second memory block group may be included in the first or second plane of the first memory die, or in the planes of a second memory die.

In an embodiment of the disclosure, a data processing system may include plural memory systems. Each of the plural memory systems 110 can include the controller 130 and the memory device 150. In the data processing system, one of the plural memory systems 110 can be a master and the others can be a slave. The master may be determined based on contention (e.g., competition for resources) between the plural memory systems 110. When a plurality of commands is delivered from the host 102 in the data processing system, the master can determine a destination of each command based at least on statuses of channels or buses. For example, a first memory system can be determined as a master memory system among a plurality of memory systems, corresponding to information (e.g., operational status) delivered from the plurality of memory systems. If the first memory system is determined as the master memory system, the remaining memory systems are considered slave memory systems. A controller of the master memory system can check statuses of a plurality of channels (or ways, buses) coupled to a plurality of memory systems, to select which memory system handles commands or data delivered from the host 102. In an embodiment, a master can be dynamically determined among the plural memory systems. In another embodiment, a master memory system may be changed with one of other slave memory systems periodically or according to an event.

A method and apparatus for transferring data in the memory system 110 including the memory system 150 and the controller 130 described above will be described in more detail. As the amount of data stored in the memory system 110 becomes larger, the memory system 110 may be required to read or store large amounts of data at a time. However, a read time for reading data stored in the memory device 150 or a program/write time for writing data in the memory device 150 may be generally longer than a handling time for the controller 130 to process data or a data transmission time between the controller 130 and the memory system 150. For example, the read time might be twice that of the handling time. Since the read time or the program time is significantly longer than the handling time or the data transmission time, a procedure or a process for delivering data in the memory system 110 may affect performance of the memory system 110, e.g., operation speed, and/or structure of the memory system 110 such as a buffer size.

Figure 6:
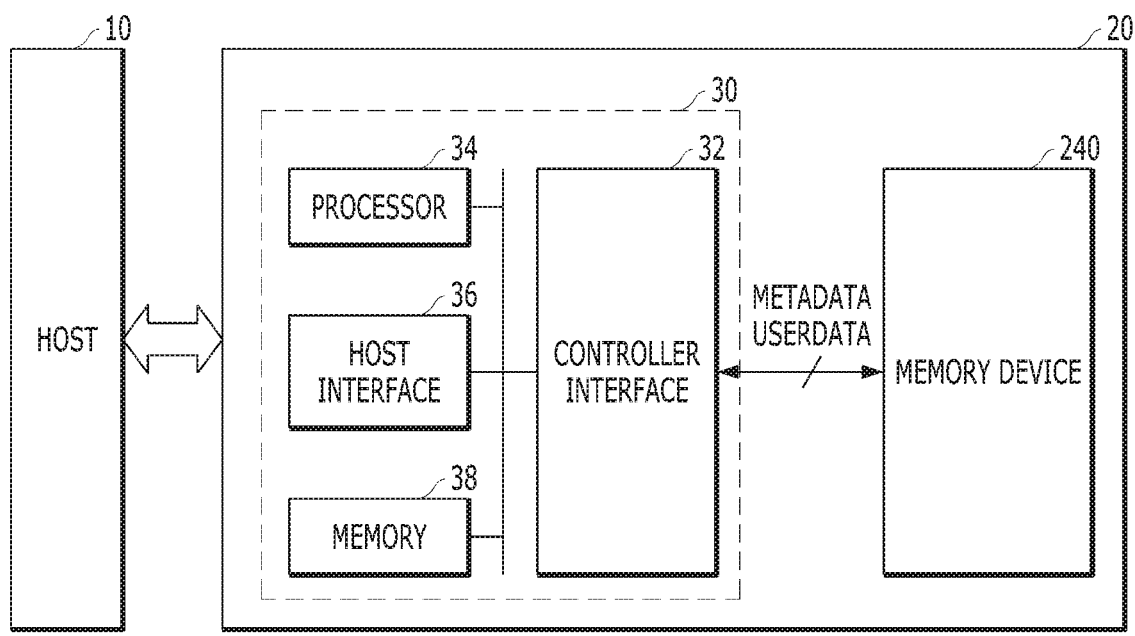
FIG. 6 illustrates a memory system including a controller and a non-volatile memory device in accordance with an embodiment of the disclosure.

In FIG. 6, a host 10 and a memory system 20 according to an embodiment of the disclosure are described. The host 10, the memory system 20 and other components can be constituted with a data processing system according to an embodiment of the disclosure. In a computing device or a mobile device embedded with the memory system 20, the memory system 20 is engaged with the host 10 to exchange data.

Referring to FIG. 6, the memory system 20 can include a controller 30 and a memory device 240. The controller 30 receives and outputs data, requested from the host 10, from the memory device 40 or stores the data transferred from the host 10 into the memory device 240 in order to perform command operations requested from the host 10. The memory device 240 includes a plurality of memory cells capable of storing data. Here, the internal configuration of the memory device 240 can be changed in accordance with the characteristics of the memory device 240, the purposes for which the memory system 20 is used, the specifications of the memory system 20 required by the host 10, or the like. For example, the memory device 150 illustrated in FIGS. 1-5 and the memory device 240 of FIG. 6 may include the same components. In addition, the controller 130 described in FIGS. 1 through 5 and the controller 30 shown in FIG. 6 may include the same components.

The controller 30 may include at least one processor 34, a host interface 36, a buffer 28, and a controller interface 32. The processor 34, for command operations within the controller 30, can play a role similar to that of a CPU used in a computing device. The host interface 36 is for data communication between the memory system 20 and the host 10, while the controller interface 32 is for data communication between the memory device 240 and the controller 30. The memory 38 temporarily stores the data and operation status required during operations performed by the processor 34, the host interface 36 and the controller interface 32. Or, the memory 38 can temporarily store I/O data between the memory device 240 and the host 10. The internal configuration of the above-described controller 30 may be a function classification according to an operation, a task, or the like which is handled or processed by the controller.

According to an embodiment, the physical configuration of the controller 30 may be composed of at least one processor, at least one memory, at least one input/output port, and a wiring for electrical connection between the above-mentioned components.

The controller 30 and the memory device 240 can exchange a metadata and a user data with each other. Here, the user data includes data to be stored by a user through the host 10, and the metadata includes system information (e.g., map data and the like) necessary for storing and managing the user data in the memory device 240. The user data and the meta data can be processed or managed in different ways in the controller 30 because the properties of them are different from each other.

As a storage capacity of the memory device 240 increases, the size of status information and the like likewise increase. Such status information can include system information, map information, and/or operation information necessary for operations such as reading, programming, and erasing data within the dies, blocks, or pages in the memory device 240. It is difficult for the controller 30 to store all the status information and the like in the memory 38. Thus, the system information, the map information, the operation information, and the like for operation such as reading, programming, erasing, etc., may be stored in the memory device 240, as well as user data. The controller may load, from the plurality of dies or blocks in the memory device 240, some information necessary for operations such as reading, programming, or delete data from pages in the memory device 240, and then re-store the updated information in the memory device 240 after the corresponding operation is completed.

Although not shown, as the number of memory cells capable of storing data in the memory device 240 increases, the internal structure of the memory device 40 can become more complicated as described in FIG. 6. The controller 30 may transmit or receive connection information according to the internal configuration of the memory device 240 together with the data. For example, in a case when a plurality of dies, each including multiple blocks, is included in the memory device 240 as shown in FIG. 6, there are n channels and m ways (n or m is an integer larger than 1) between the controller 30 and the memory device 240. The data and the connection information may be transferred via the n channels and the m ways. However, in order for the controller 30 to read or write data to the memory device 240, additional control variables or control signals may be needed depending on the internal structure of the memory device 240. As more dies are included in the memory device 240, additional information required for performing operations becomes larger.

For example, the host 10 and the memory system 20 can exchange commands, addresses, data, and the like with each other, according to a protocol, a system communication method, or an interface. Thus, the host 10 may not need to be aware of the specific structure within the memory system 20. When the host 10 stores a specific data to the memory system 20 or attempts to read a data stored in the memory system 20, the host 10 sends a logical block address (LBA). Here, the logical block address (LBA) is a logical block addressing method, and may be a format used to specify the location of a data block to be recorded in a storage device associated with a computing device. For example, in the case of a conventional hard disk, an addressing method indicating a physical structure included in a hard disk, such as a cylinder, a head, and a sector (Cylinder-Head-Sector, CHS) was used. However, the address system corresponding to the physical structure of the hard disk has reached the limit as the storage capacity of the hard disk increases. In such a large-capacity storage device, the address can be specified in a manner that the sectors are arranged in a logical sequence in a row, and the sectors are numbered (for example, in order from 0), regardless of the physical structure of the hard disk. Instead of the host 10 transferring or pointing data only to the logical block address (LBA), the controller 30 included in the memory system 20 may store and manage the physical address, which is the address in the memory device 240 where the actual data is stored, It is necessary to match and manage the logical block address (LBA) used by the host 10. Such information may be included in a metadata and may be distinguished from a user data stored or read by the host 10.

As the amount of data that can be stored in the memory device 40 increases, efficient management of metadata may be required. Also, as the size of the plurality of blocks included in the memory device 240 increases, the amount of data that can be stored increases as well as the amount of metadata also increases. This increases the resources (e.g., time) required to maintain and manage the stored data in the memory device 240, so that an apparatus and method for increasing the operational efficiency, stability, or reliability of the memory system 20 may be required.

According to an embodiment, the memory system 20 may include a memory device 240 that includes a plurality of blocks capable of storing data. In addition, the memory system 20 can the controller 30 configured to divide each block into a plurality of logical unit blocks. The controller 30 can compare a valid page count of the block with the number of map data of each logical unit block, check whether the map data is duplicated in a reverse order of programming data in the block, and delete or nullify old duplicated map data. A procedure for comparing, verifying and deleting by the controller 30 to adjust the map data may be performed in a specific block having a state in which data can no longer be written to that block without an erase operation (for example, closed state).

The controller 30 can compare the valid page count with the number of map data when plural program operations with different data corresponding to a same logical block address is repeatedly required by commands entered from the host 10. According to an embodiment, each of plural memory blocks in the memory device 240 may be stored sequentially from the first page to the last page therein. Herein, a block is a unit in which an erase operation is performed. At least two logical unit blocks may be included in a block. The logical unit block may be a minimum unit to which map data is allocated or managed together. Here, the map data may include information (Physical to Logical, P2L) used for associating a physical address, assigned in each block unit, with a logical address used by the host 102.

Figure 7:
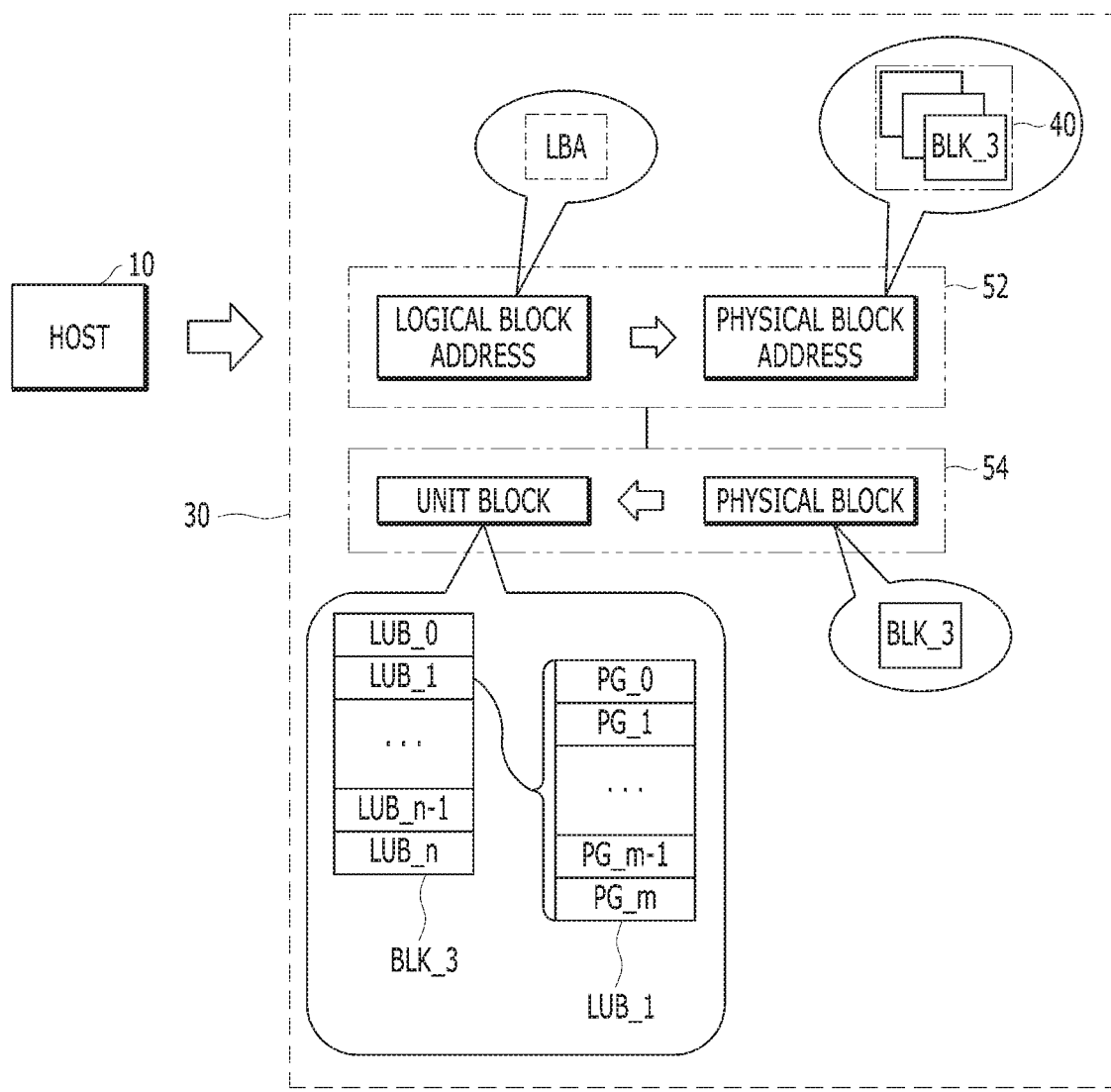
FIG. 7 illustrates a method for controlling metadata in a controller in accordance with an embodiment of the disclosure.

FIG. 7 shows a method for managing metadata, which can be performed by a controller of the memory system. In FIG. 7, the host may transfer a command to the memory system 20 (see FIG. 6) to repeatedly program data associated with the same logical block address (LBA). A memory device 40 in the memory system 20 can include a non-volatile memory device (e.g., flash memory). If the memory system 20 can write or program data to a specified physical location and then overwrite other data, the memory system 20 can repeatedly overwrite different data entered from the host 10 with the same logical block address (LBA) at the same location of the memory device 40. However, in the non-volatile memory device (e.g., flash memory) such as the memory device 40 of memory system 20, it is not possible to overwrite data at the same location and therefore the data must be programmed at a new (different) location.

Referring to FIG. 7, the controller 30 may receive data, a logical block address, and a program command transmitted from the host 10. The controller 30 may translate the logical block address into a physical block address in response to the program command (52). Here, the logical block address received by the controller 30 may be a logical address or a logical block address (LBA) which the host 10 recognizes and uses. For example, the logical address is an indicator for identifying one of sectors, spaces or areas sequentially arranged in a whole user data storage. For example, a specific logical block address (LBA) can be translated into a physical block address BLK_3 in the memory device 40 of the memory system. By way of example but not limitation, such address translation may be achieved by firmware that implements the FTL described above.

As the memory system stores a larger amount of user data, each block (e.g., BLK_3) has a larger size. Accordingly, a memory block (e.g., BLK_3) in the memory device 40 can be divided into a plurality of logical unit blocks LUB_0 to LUB_n (54). Some operation can be controlled or managed on a basis of a logical unit block, that is, logical unit block by logical unit block. For example, the block BLK_3 may include 'n' number of logical unit blocks LUB_0 to LUB_n. Here, 'n' is a natural number of 2 or more. Each logical unit block (e.g., LUB_1) may include 'm' number of pages PG_0 to PG_m, where m is a natural number of 2 or more.

According to an embodiment, individual map data may be assigned or allocated to each logical unit block. In an embodiment, a physical to logical (P2L) mapping table for matching a physical address corresponding to each logical unit block with a logical address can be generated to determine whether data stored in each of plural pages included in a logical unit block is valid.

Figure 8:
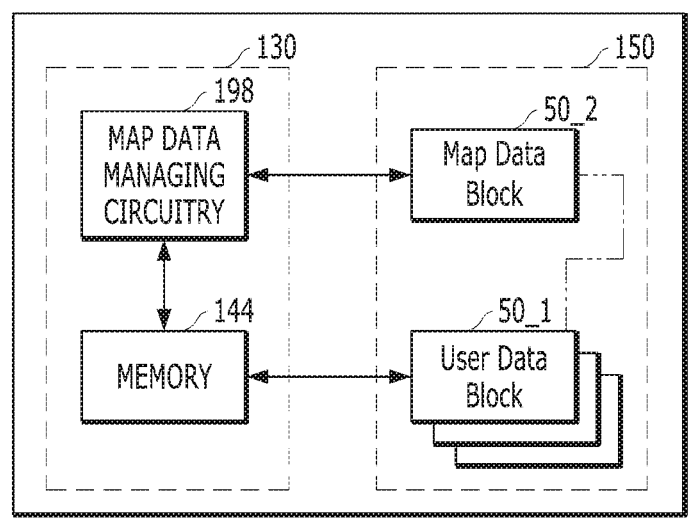
FIG. 8 illustrates map data stored in a memory system in accordance with an embodiment of the disclosure.

FIG. 8 illustrates map data stored in the memory system. In FIG. 8, a memory system 110 may include a controller 130 and a memory device 150. Specifically, the controller 130 may include map data managing circuitry 198 and a memory 144. In addition, the memory device 150 may include a non-volatile memory device. The controller 130 can generate map data associated with user data stored in the user data block 50_1 in consideration of the characteristics of the memory device 150. Further, the generated map data is stored in the memory device 150, and then the controller 130 can use the map data to recognize a position of the user data and/or verify whether the user data is valid.

Referring to FIGS. 4, 6 and 8, the map data can be classified into two types. One includes a first address information source (e.g., L2P map table) that connects a logical address used by the host to a physical address used in the memory device. The other includes a second address information source for engaging the physical address used in the memory device with the logical address used by the host (e.g., a P2L map table).

The map data including the first address information source and the second address information source may be stored in the memory device 150 together with the user data. According to an embodiment, referring to FIG. 8, a block 50_1 for storing user data in the memory device 150 can be physically divided or separate from a block 50_2 for storing map data. Although not shown, the controller 130 may store user data in odd-numbered pages in one block and map data in even-numbered pages in the same block.

In the memory device 150 that does not support overwriting, a location where data corresponding to a specific logical address is stored in the memory device 150 may be continuously changed when new or different data delivered via the memory 144 is programmed into the user data block 50_1, when data loaded into the memory 144 is updated and programmed into the user data block 50_1, or when data for garbage collection or wear leveling may be transferred or moved. In response to these changes, the map data managing circuitry 198 may update the first address information source and the second address information source. The map data managing circuitry 198 may delete, nullify or invalidate the map data that is no longer valid for the first address information source and the second address information source. According to an embodiment, in order to determine the validity of the map data, the map data managing circuitry 198 may compare the first address information source and the second address information source with each other (e.g., cross-checking). In response to a program operation, the map data managing circuitry 198 can generate updated map data. The updated map data can be stored in the block 50_2 storing the map data.

Figure 9:
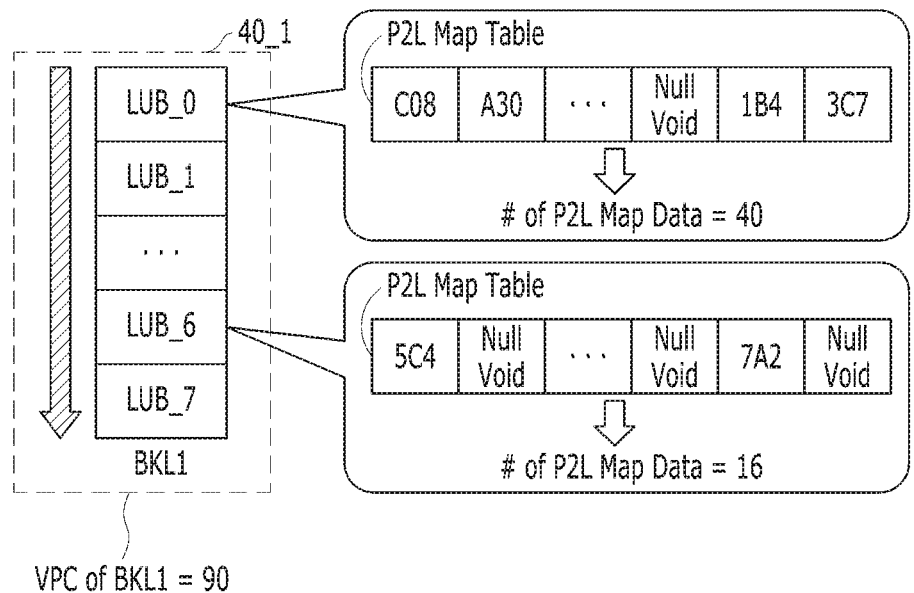
FIG. 9 illustrates operations for programming data in a block of a memory device and generating map data.

FIG. 9 illustrates operations for programming data into a block in a memory device and generating map data.

Referring to FIG. 9, an operation for programming data in a block BLK_1 in a memory device will be described. Here, it is assumed that the block BLK_1 in the memory device includes eight logical unit blocks LUB_0 to LUB_7.

Data can be sequentially programmed from the first page of the block BLK_1 (i.e., the first page of the first logical unit block LUB_0) to the last page (i.e., the last page of the eighth logical unit block LUB_7) in the memory device. When the data is programmed, map data associated with the data can be generated. In FIG. 9, a second address information source (e.g., a P2L map table) for engaging a physical address with a logical address used by the host is described as an example of the map data.

When data from the first page to the last page of the first logical unit block LUB_0 are programmed, the controller 130 (see FIGS. 1 to 3 and 8) can generate the second address information source (P2L map table). For example, the second address information source can include logical addresses of 'C08,' 'A30,' . . . , Null/Void, '1B4,' '3C7,' and the like. The logical addresses of the second address information source may respectively correspond to sequential pages of the first logical unit block LUB_0. That is, the logical address associated with the first page of the first logical unit block LUB_0 may be 'C08.'

When data is programmed into the first logical unit block LUB_0 to the eighth logical unit block LUB_7 of the memory block BLK_1, the controller 130 can determine a valid page count (VPC) of the block BLK_1 in the memory device. According to an embodiment, the valid page count (VPC) may be determined based on the first address information source (e.g., an L2P map table) that engages a logical address used by the host to a physical address used by the memory device. Here, it can be assumed that the valid page count (VPC) of the block BLK_1 in the memory device is 90.

Whenever the controller 130 programs data on the last page of each of the first logical unit block LUB_0 to the eighth logical unit block LUB_7 of the block BLK_1 in the memory device, the second address information source (e.g., P2L map table) can be generated for the program-completed logical unit block. A map data count, i.e., the number of map data in each logical unit block can be determined based on the second address information source (e.g., P2L map table) generated for each logical unit block. Referring to FIG. 9, the map data count of the first logical unit block LUB_0 is 40, and the number of map data of the seventh logical unit block LUB_6 is 16. Here, when determining the number of map data of each logical unit block, the deleted, nullified or invalidated map data may not be included.

According to an embodiment, the total number of map data from the first logical unit block LUB_0 to the eighth logical unit block LUB_7 of the block BLK_1 in the memory device may be equal to the valid page count VPC. In this case, it can be presumed that all map data is valid. However, if a total number of map data regarding all logical unit blocks and the valid page count (VPC) in a specific block BLK_1 are not the same, it is found that at least some of map data associated with data stored in the block BLK_1 in the memory device is not valid. The controller 130 may perform an operation for checking validity of the map data. For example, the first address information source and the second address information source generated by the controller 130 may be compared with each other, or it may be determined that some of map data are duplicated within the second address information source.

Figure 10:
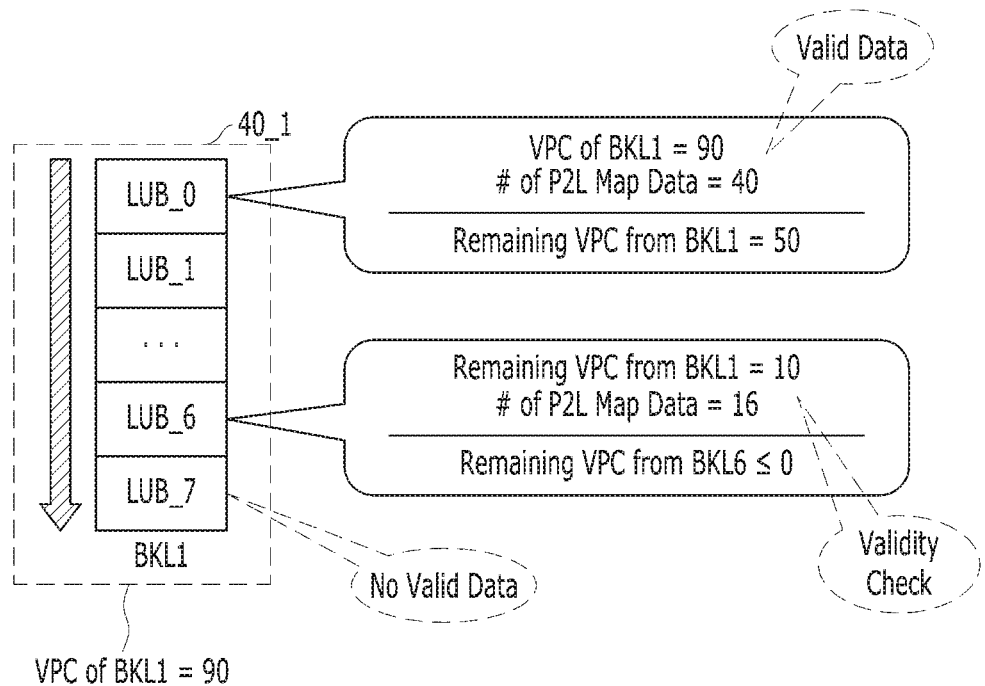
FIG. 10 shows a method for searching valid data in a block of a memory device during garbage collection.

FIG. 10 illustrates a method for searching for valid data in a block during the garbage collection. In FIG. 10, a method for searching valid data will be described in same context as FIG. 9.

Referring to FIG. 10, the search for valid data can be performed sequentially from the first logical unit block (LUB_0) to the eighth logical unit block (LUB_7) of the block (BLK_1) in the memory device.

In FIG. 10, it is assumed that the number of valid pages (VPC of BLK1) of the block BLK_1 in the memory device is 90. It is also assumed that the map data count for the first logical unit block LUB_0 included in the block BLK_1 of the memory device is 40.

Since the map data count of the first logical unit block LUB_0 is and the valid page count VPC of the block BLK_1 is 90, the valid page count VPC of the block BLK_1 is larger than the map data count of the first unit block LUB_0. When the map data count of the first unit block LUB_0 is subtracted from the valid page count VPC of the block BLK_1 (i.e., 90-40), the remaining valid page count (Remaining VPC from BLK1) is '50.' It is presumed that data stored in the first logical unit block LUB_0 and thus associated with the map data for the first logical unit block LUB_0 is valid.

Then, the remaining valid page count ('50,' Remaining VPC from BLK1) can be compared with the map data count of the second logical unit block LUB_1. Valid data of the second logical unit block LUB_1 is presumed. The remaining valid page counts from the second logical unit block LUB_1 to the seventh logical unit block LUB_6 and the map data counts of each logical unit blocks can be sequentially compared with each other. Then, it may be considered that data stored in the logical unit block can be valid.

In FIG. 10, the map data count of the seventh logical unit block LUB_6 is 16, and the remaining valid page count after subtracting the number of map data of the sixth logical unit block is 10. When the map data count of the seventh unit block LUB_6 is subtracted from the remaining valid page count (i.e., 10-16), the remaining valid page count '−6' is smaller than zero. In this case, at least some of data stored in the seventh logical unit block LUB_6 is invalid. Therefore, it is possible to check the map data validity of the data stored in the seventh unit block LUB_6.

When the remaining valid page count '−6' is smaller than zero because the map data count of the seventh unit block LUB_6 is subtracted from the remaining valid page count (i.e., 10-16), it can be determined that there is no valid data in the eighth logical unit block LUB_7 followed by the seventh unit block LUB_6. In this case, an operation for checking validity of data or map data regarding the eighth unit block LUB_7 might be not necessary.

In an embodiment described with reference to FIG. 10, the validity of data is checked with respect to the first logical unit block LUB_1 to the seventh logical unit block LUB_6. In at least one another logical unit block (for example, the eighth unit block LUB_7) in the block BLK1, it becomes unnecessary to search for valid data. At least one logical unit block in the specific block BLK1 can be skipped, so that time consumed for searching for valid data in the block BLK1 can be reduced when the block BLK1 is determined as a victim block of the garbage collection.

When the map data count of the second unit block LUB_1 is subtracted from the remaining valid page count from the first logical unit block LUB_0, the remaining valid page count from the second logical unit block LUB_1 may be less than zero. In this case, the operation for searching valid data from the third logical unit block LUB_2 to the eighth unit block LUB_7 or checking the number of map data may be omitted.

On the other hand, the remaining valid page count may be equal to the map data count of the logical unit block. In this case, it can be determined that all data stored in the corresponding logical unit block are valid. If the remaining valid page count is equal to the map data count of the logical unit block, it can be determined that data stored in logical unit blocks subsequent to the logical unit block is not valid. Through these processes, a search range for checking the validity of data stored in the block can be greatly reduced. The operation speed of the garbage collection can be improved.

Figure 11:
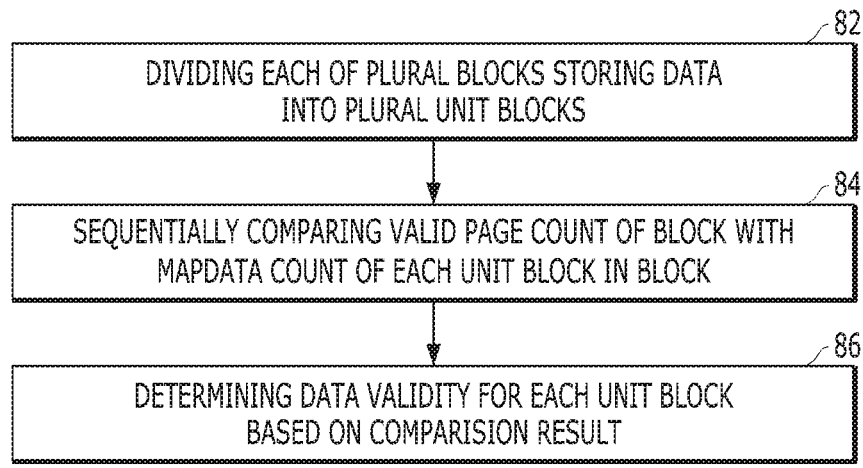
FIG. 11 illustrates a method for operating a memory system in accordance with an embodiment of the disclosure.

FIG. 11 illustrates a method of operating a memory system according to another embodiment of the disclosure.

Referring to FIG. 11, an operation method of a memory system can include dividing each of plural blocks storing data into plural unit blocks (step 82), sequentially comparing a valid page count with a map data count of each unit block included in a specific block (step 84), and determining data validity for each unit block based on a comparison result (step 86). Although not shown in FIG. 11, the operation method can further include determining whether to perform a garbage collection operation when at least one memory block of the plural blocks is not programmable without an erase operation.

The garbage collection operation may be performed on a victim block which is in a closed state. The block including at least two logical unit blocks is a distinct group of memory cells that are erasable together as a unit. The unit block can be identified by a number of map data each assigned to a distinct group of memory cells that are programmable together as a unit.

According to an embodiment, in the process of selecting a victim block to be subjected to the garbage collection operation among a plurality of blocks in the memory device, the valid page count of each block and the address information source generated for each of plural unit blocks in the block can be considered. For example, the step of determining whether to perform the garbage collection (which can be included in the step 82) may include a step of assigning a higher priority to a specific block as a victim block of the garbage collection operation, as a ratio of the sum of the map data of the plural unit blocks divided by the number of pages in the block is lower. Here, the ratio of the sum of the map data of the plural unit blocks divided by the number of pages in the block may correspond to a ratio of valid data stored in the block.

Although not shown, the valid page count of a specific block can be compared with the sum of map data of plural unit blocks in the specific block in order to determine whether garbage collection is performed against the specific block. Further, it can be determined whether the map data of the specific block is valid. The more accurate the map data associated with the data stored in the block as a victim block for the garbage collection operation, the faster the valid data can be detected in the process of performing the garbage collection operation. To this end, if it is determined that the map data is not correct or valid, it is possible to delete, nullify or invalidate some map data that are determined as incorrect or invalid.

When at least one of plural blocks in the memory device is selected as a victim block for the garbage collection operation, it is necessary to determine which data stored in the selected block is valid. According to an embodiment, a valid page count (VPC) which is operation information regarding each block and a map data count generated for each of plural unit blocks in the block can be utilized to determine that data stored in each unit block is presumably valid. Although not shown, the sequential comparison step 84 may include comparing the valid page count with the number of map data of a single unit block selected among a plurality of unit blocks of the selected victim block. The valid page count (VPC) may be compared with the map data count of each unit block sequentially, which means that the determination regarding validity of the data stored in each unit block may be different according to the comparison result for that block.

For example, in the data validity determination step 86, it is determined that, when the number of map data of a unit block is less than the valid page count, an operation for checking data validity can be performed for that unit block. Further, it is determined that data stored in at least one unit block located after the just-checked unit block is no longer valid when the just-checked unit block is not the last unit block of that block.

On the other hand, the data validity determination step 86 can include, when the map data count of a unit block is larger than the remaining valid page count, subtracting the map data count of a unit block from the remaining valid page count. This example may be similar to the data validity determination for the first unit block LUB_0 in FIG. 10. After that, the comparison step 84 may include comparing the map data count regarding another unit block located after the unit block with the remaining valid page count after being subtracted by the map data count of the unit block. This can correspond to a case where the map data count and the remaining valid page count are sequentially compared with each other in an order from the first logical unit block LUB_0 to the seventh logical unit block LUB_6 in FIG. 10. But, when the map data count of a unit block is greater than the remaining valid page count, an operation for determining data validity can be performed. This case may be similar to an operation for data validity determination regarding the seventh logical unit block LUB_6 of FIG. 10.

In the data validity determination step 86, when the map data count of a single unit block is equal to the remaining valid page count, all data stored in that unit block is presumed valid, and it is determined that data stored in the next unit block is no longer valid.

Figure 12:
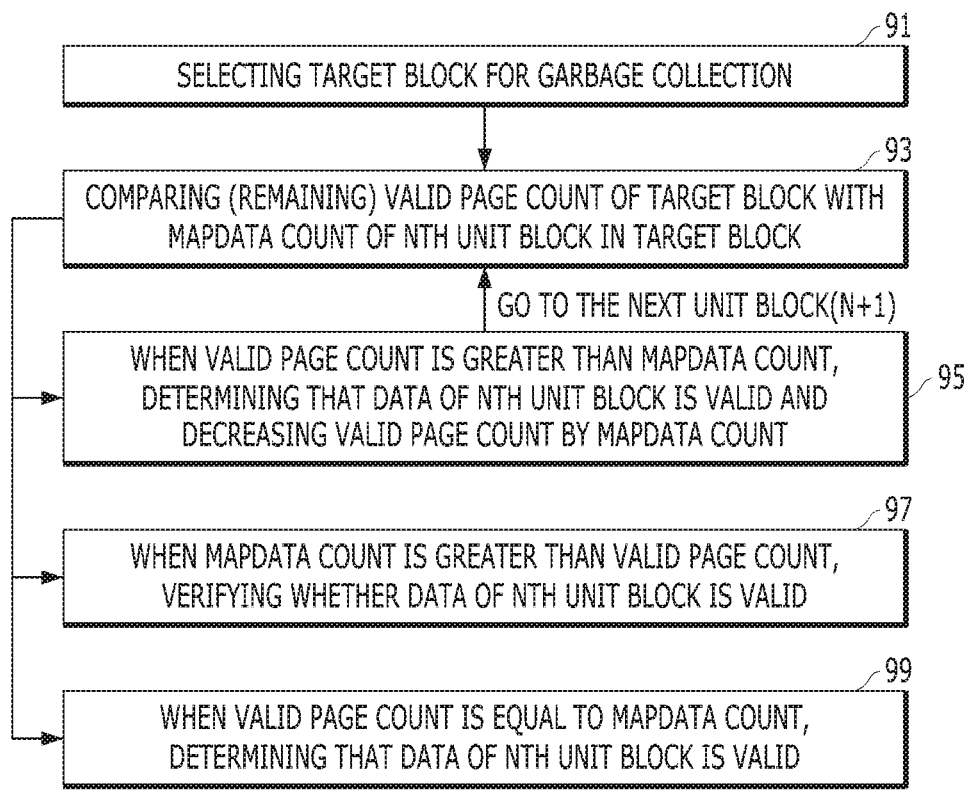
FIG. 12 illustrates a method for operating a memory system in accordance with another embodiment of the disclosure.

FIG. 12 illustrates a method of operating a memory system according to another embodiment of the disclosure.

Referring to FIG. 12, memory system may select a victim block for garbage collection operation at step 91. The garbage collection operation is generally performed in a background operation in which the memory system does not process commands entered from the host. The garbage collection operation may not be performed in a free block among plural blocks in the memory device, nor in an open block in which data is programmed. The garbage collection operation can be performed by preferentially selecting a block having a low percentage of valid data among the blocks which are in a closed state. According to an embodiment, a victim block may be first selected based on data retention, instead of a ratio of valid data stored in the block, among the plural blocks which are in a closed state.

When the garbage collection operation begins, the memory system searches for valid data within the selected victim block. To this end, the memory system may compare the valid page count of the victim block with the map data count of Nth logical unit block in the victim block at step 93. N is a natural number, and an initial value of N may be one. That is, the memory system may compare the valid page count (or the remaining valid page count) with the map data count sequentially from the first logical unit block (first logical unit block) in the victim block.

When the comparison indicates that the valid page count is greater than the map data count of Nth logical unit block, the memory system may determine that data stored in the Nth logical unit block is valid and subtract the map data count from the valid page count at step 95. After the valid page count is reduced by the map data count, the process moves to the next, i.e., (N+1)th logical unit block. The memory system may compare the remaining valid page count with the map data count of the (N+1)th logical unit block (step 93).

When the map data count is greater than the (remaining) valid page count according to a comparison result, the memory system may determine data validity in that logical unit block (Nth logical unit block) in which the comparison operation has been performed at step 97. In this case, the memory system can determine that at least some of the data in that logical unit block is not valid, through checking data validity.

When the (remaining) valid page count is equal to the map data count according to a comparison result, the memory system may determine that data of that logical unit block (the Nth logical unit block) in which the comparison operation has been performed is valid at step 99.

Although not shown, in a case where the map data count is greater than or equal to the (remaining) valid page count in accordance with a comparison result, the memory system may determine that the remaining logical unit blocks, e.g., the (N+1)th logical unit block to the last logical block, of victim block do not store valid data, and as a result does not search for the valid data for the garbage collection operation. These methods can reduce resources (e.g., time, power, etc.) required to navigate and extract valid data during the garbage collection operation.

Figure 13:
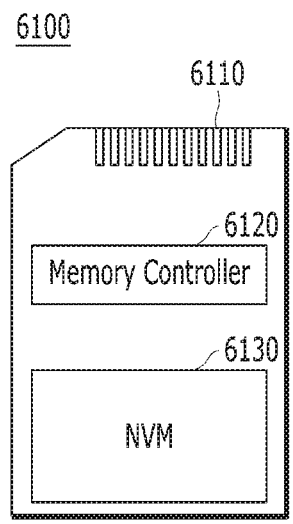
FIGS. 13 to 21 are block diagrams that schematically illustrate other data processing systems including a memory system in accordance with embodiments of the disclosure.

In FIG. 13, another example of a data processing system including a memory system is described. FIG. 13 schematically illustrates a memory card system to which the memory system in accordance with an embodiment is applied.

Referring to FIG. 13, a memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By way of example but not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 3, and the memory device 6130 may correspond to the memory device 150 of the memory system 110 described with reference to FIGS. 1 and 5.

Thus, the memory controller 6120 may include a RAM, a processor, a host interface, a memory interface and an error correction component. The memory controller 130 may further include the elements shown in FIGS. 1 and 3.

The memory controller 6120 may communicate with an external device, for example, the host 102 of FIG. 1 through the connector 6110. For example, as described with reference to FIGS. 1 to 3, the memory controller 6120 may be configured to communicate with an external device according to one or more of various communication protocols, such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices, particularly mobile electronic devices.

The memory device 6130 may be implemented by a nonvolatile memory. For example, the memory device 6130 may be implemented by various nonvolatile memory devices, such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and/or a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may be so integrated to construct a solid state driver (SSD). In another embodiment, the memory controller 6120 and the memory device 6130 may be integrated to construct a memory card, such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and/or a universal flash storage (UFS).

Figure 14:
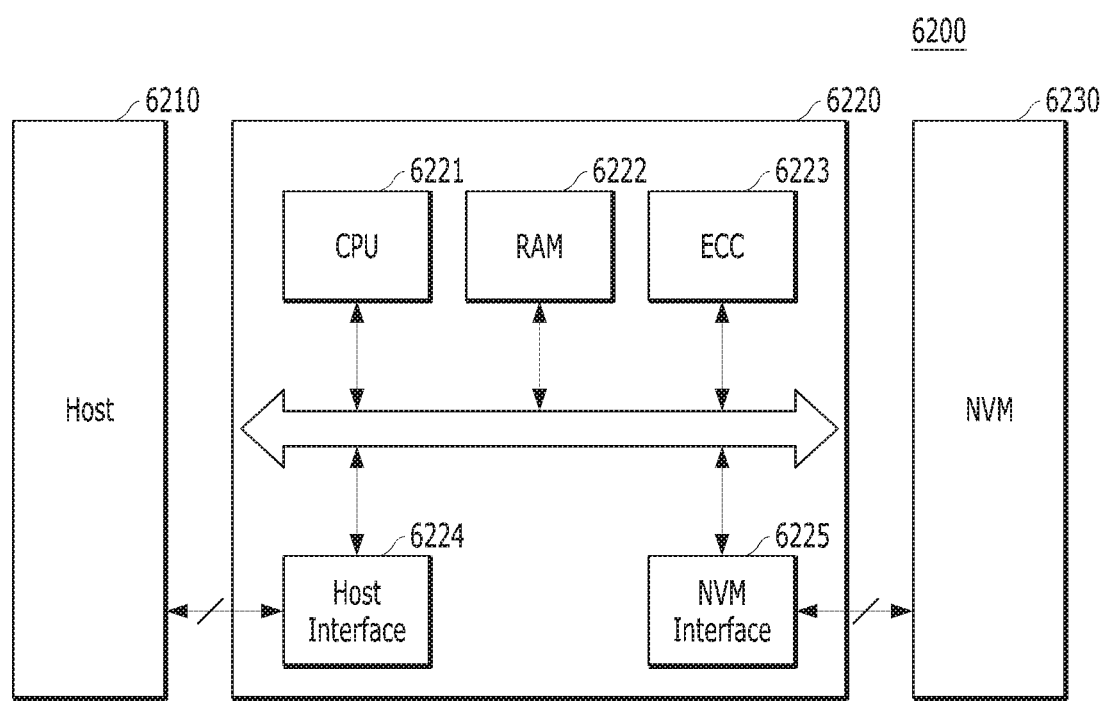

FIG. 14 is a diagram schematically illustrating another example of the data processing system including the memory system in accordance with an embodiment.

Referring to FIG. 14, the data processing system 6200 may include a memory device 6230 having one or more nonvolatile memories and a memory controller 6220 for controlling the memory device 6230. The data processing system 6200 illustrated in FIG. 14 may serve as a storage medium such as a memory card (CF, SD, micro-SD or the like) or USB device, as described with reference to FIGS. 1 and 2. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then exchange data with the external device. Particularly, as the memory controller 6220 is configured to communicate with the external device through one or more of various communication protocols, the memory system and the data processing system in accordance with an embodiment may be applied to wired/wireless electronic devices, particularly a mobile electronic device.

Figure 15:
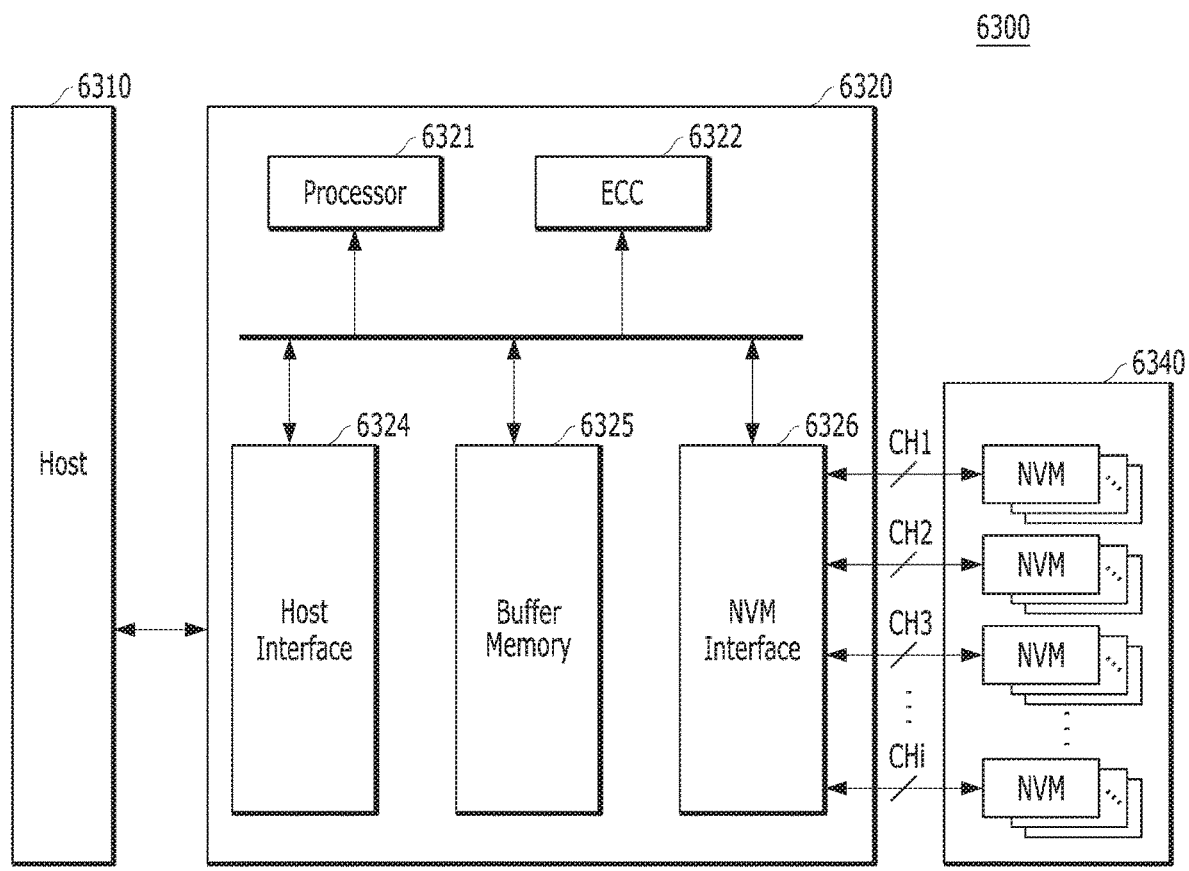

FIG. 15 is a diagram schematically illustrating another example of the data processing system including the memory system. FIG. 15 schematically illustrates an SSD to which the memory system in accordance with an embodiment is applied.

Referring to FIG. 15, the SSD 6300 may include a controller 6320 and a memory device 6340 including a plurality of nonvolatile memories. The controller 6320 may correspond to the controller 130 in the memory system 110 of FIGS. 1 and 2. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories, such as DRAM, SDRAM, DDR SDRAM, LPDDR SDRAM and GRAM or nonvolatile memories such as FRAM, ReRAM, STT-MRAM and PRAM. FIG. 15 illustrates that the buffer memory 6325 is disposed in the controller 6320. However, the buffer memory 6325 may be external to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 16:
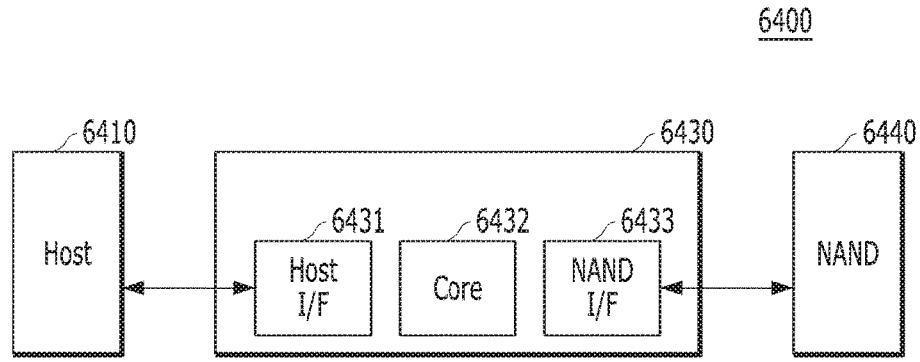

FIG. 16 is a diagram schematically illustrating another example of the data processing system including the memory system. FIG. 13 schematically illustrates an embedded Multi-Media Card (eMMC) to which the memory system in accordance with an embodiment is applied.

Referring to FIG. 16, the eMMC 6400 may include a controller 6430 and a memory device 6440 embodied by one or more NAND flash memories. The controller 6430 may correspond to the controller 130 in the memory system 110 of FIGS. 1 and 2. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 17 to 20 are diagrams schematically illustrating other examples of the data processing system including the memory system. FIGS. 17 to 20 schematically illustrate UFS (Universal Flash Storage) systems to which the memory system in accordance with embodiments is applied.

Referring to FIGS. 17 to 20, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 13 to 16, and the UFS cards 6530, 6630, 6730, 6830 may be embodied in the form of the memory card system 6100 described with reference to FIG. 13.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 17:
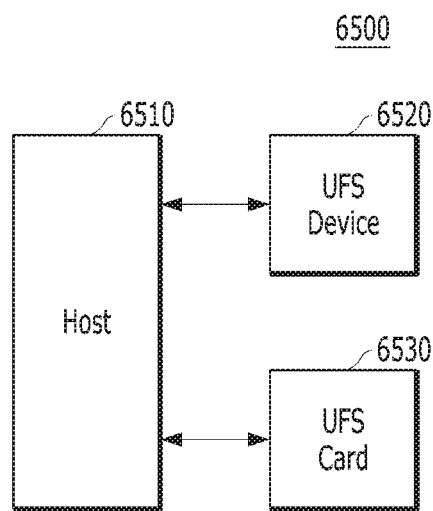

In the UFS system 6500 illustrated in FIG. 17, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 17, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6410. The form of a star is a sort of arrangement where a single centralized component is coupled to plural devices for parallel processing. A plurality of UFS cards may be connected in parallel or in the form of a star to the UFS device 6520 or connected in series or in the form of a chain to the UFS device 6520.

Figure 18:
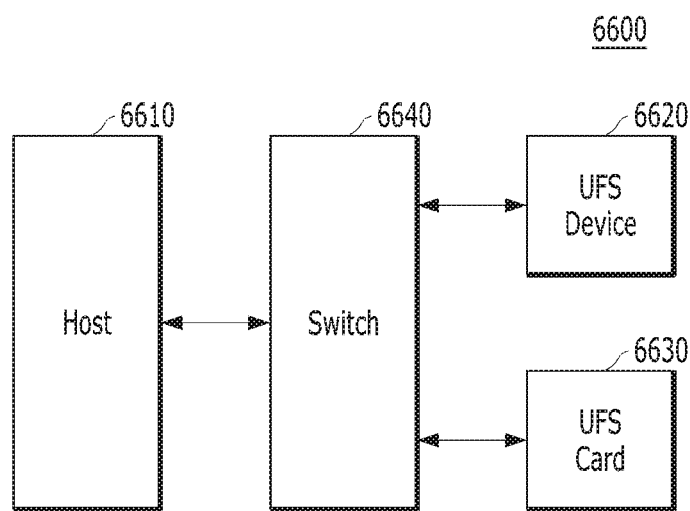

In the UFS system 6600 illustrated in FIG. 18, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 18, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 19:
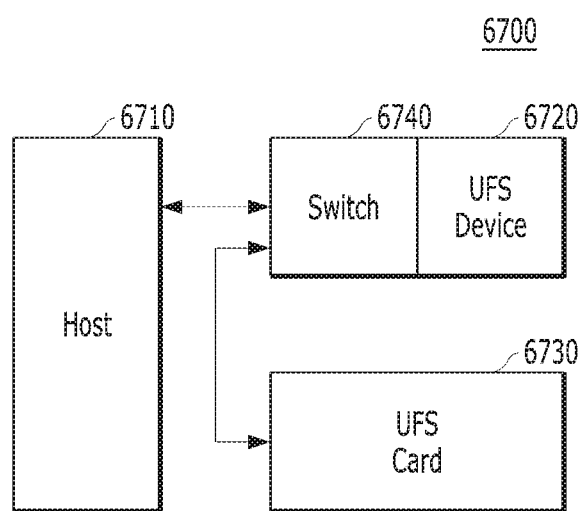

In the UFS system 6700 illustrated in FIG. 19, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the embodiment of FIG. 19, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host, 6710 or connected in series or in the form of a chain to each other. Furthermore, a plurality of UFS cards may be connected in parallel or in the form of a star to the UFS device 6720.

Figure 20:
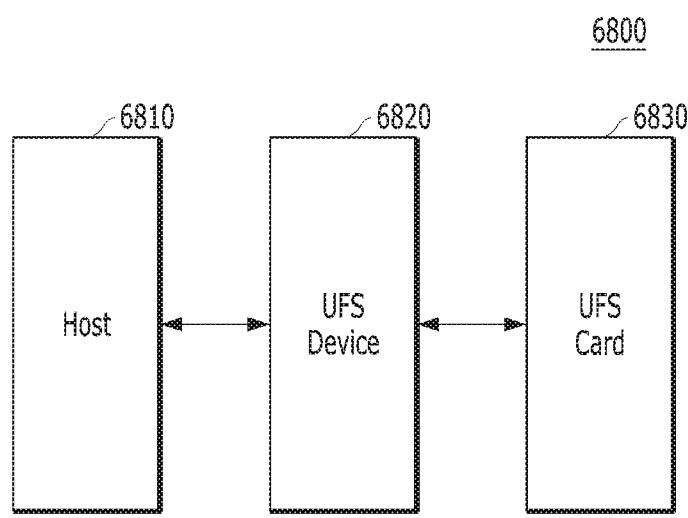

In the UFS system 6800 illustrated in FIG. 20, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the embodiment of FIG. 20, the configuration in which one UFS device 6820 is connected to the host 6810 and one UFS card 6830 is connected to the UFS device 6820 is illustrated by way of example. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 21:
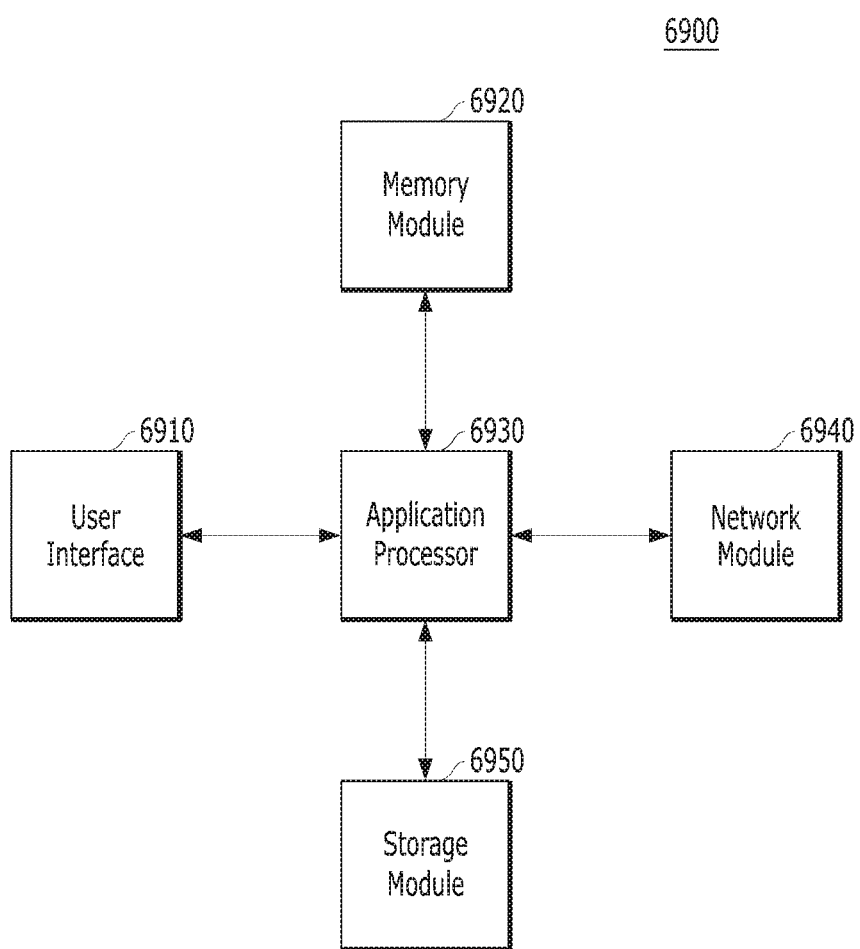

FIG. 21 is a diagram schematically illustrating another example of the data processing system including the memory system. FIG. 21 is a diagram schematically illustrating a user system to which the memory system in accordance with an embodiment is applied.

Referring to FIG. 21, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphics engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM, such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols, such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, an eMMC and an UFS which are described above with reference to FIGS. 15 to 20.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

In accordance with embodiments described above, a memory system, a data processing system, and an operation method thereof can significantly reduce the time required to search for, and extract, valid data during garbage collection so that the garbage collection can be performed more quickly in the memory system. For example, it is possible to greatly reduce the time of the validity check operation for verifying whether the stored data is valid. It may be easier to manage foreground or background operations that may be performed by valid data searching in the memory system. Thus, stability and reliability of the memory system can be improved.

Embodiments of the disclosure provide a configuration which divides a block capable of storing a large amount of data into a plurality of logical unit blocks, generates and manages a map data count for each logical unit block, and compares a valid page count of the block with the map data count of each logical unit block. It is possible to reduce the range of the validity check operation for determining whether the stored data is valid.

While the disclosure has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system, comprising:
a memory device including plural memory blocks storing a data; and
a controller configured to divide a memory block into plural logical unit blocks, compare a valid page count of the memory block with a map data count of each logical unit block sequentially, and determine data validity of each logical unit block for a garbage collection operation based on a comparison result,
wherein the controller is configured to subtract a map data count of a select logical unit block from the valid page count, when the valid page count is greater than the map data count of the select logical unit block, and compare a subtracted valid page count with a map data count of another logical unit block followed by the select logical unit block.

2. The memory system according to claim 1, wherein the controller determines that data stored in at least one logical unit block subsequent to the select logical unit block, of the logical unit blocks, is invalid when the valid page count is less than the map data count of the select logical unit block.

3. The memory system according to claim 2, wherein the controller is configured to perform a validity check operation against data stored in the select logical unit block.

4. The memory system according to claim 2, wherein the controller is configured to determine that all data stored in the select logical unit block is valid when the valid page count is equal to the map data count and determine that data stored in at least one logical unit block subsequent to the select logical unit block is invalid.

5. The memory system according to claim 1, wherein the controller is configured to perform a validity check operation against data stored in the another logical unit block.

6. The memory system according to claim 1, wherein the map data count is determined on a logical unit block by logical unit block basis and is the number of map data for associating physical addresses with logical addresses.

7. The memory system according to claim 1, wherein the memory block including at least two logical unit blocks is a distinct group of memory cells that are erasable together as a unit, and the logical unit block is identified by a set number of map data each assigned to a distinct group of memory cells that are programmable together as a unit.

8. The memory system according to claim 1, wherein the controller is configured to compare the valid page count with a total number of map data of the plural logical unit blocks when the memory block is not programmable without an erase operation.

9. The memory system according to claim 8, wherein the controller is configured to select at least one memory block having the largest difference between a valid page count and a total number of map data thereof, among the plural memory blocks, and check validity of map data stored in selected memory block.

10. The memory system according to claim 1, wherein the controller is configured to preferentially designate a memory block among the plural memory blocks as a victim block for the garbage collection operation, the designated memory block having a lowest ratio of a total number of valid map data of plural logical unit blocks therein to a number of pages in the designated memory block.

11. A method for operating a memory system, comprising:
dividing each of plural memory blocks storing a data into plural logical unit blocks;
determining whether to perform a garbage collection operation when at least one memory block of the plural memory blocks is not programmable without an erase operation;

comparing a valid page count of the memory block with a map data count of each logical unit block of the memory block sequentially; and determining data validity of each logical unit block for a garbage collection operation based on a comparison result, wherein the determining of the data validity includes:

when the valid page count is greater than a map data count of a logical unit block selected among the plural logical unit blocks, subtracting the map data count of the selected logical unit block from the valid page count; and determining that data stored in the selected logical unit block is valid.

12. The method according to claim 11, wherein the comparing of the valid page count includes:

comparing the valid page count with the map data count of the selected logical unit block selected among the plural logical unit blocks.

13. The method according to claim 12, wherein the determining of the data validity includes:

when the valid page count is less than the map data count of the selected logical unit block, determining that data stored in at least one logical unit block subsequent to the selected logical unit block is invalid; and performing a validity check operation against data stored in the selected logical unit block.

14. The method according to claim 12, wherein the determining of the data validity includes:

when the valid page count is equal to the map data count of the selected logical unit block, determining that all data stored in the selected logical unit block is valid; and determining that data stored in at least one logical unit block subsequent to the selected logical unit block is invalid.

15. The method according to claim 11, wherein the determining of the data validity includes:

comparing a subtracted valid page count with a map data count of another logical unit block sequentially following the selected logical unit block; and performing a validity check operation against data stored in the another logical unit block when the subtracted valid page count is less than the map data count of the another logical unit block.

16. The method according to claim 11, wherein the determining whether to perform a garbage collection operation includes:

comparing a valid page count and a total number of map data regarding each memory block;

selecting at least one memory block having the largest difference between the valid page count and the total number of map data thereof; and checking validity of map data stored in selected memory block.

17. The method according to claim 11, wherein the determining whether to perform a garbage collection operation includes preferentially designating a memory block among the plural memory blocks as a victim block for the garbage collection operation, the designated memory block having a lowest ratio of a total number of valid map data of plural logical unit blocks therein to a number of pages in the designated memory block.

18. An apparatus for controlling a memory system including at least one processor and at least one memory including computer program code, wherein the at least one memory and the computer program code are configured, with the at least one processor, to cause the apparatus to:

divide each of plural memory blocks storing a data into plural logical unit blocks;

determine whether to perform a garbage collection operation when at least one memory block of the plural memory blocks is not programmable without an erase operation;

compare a valid page count of the memory block with a map data count of each logical unit block of the memory block sequentially; and determine data validity of each logical unit block for a garbage collection operation based on a comparison result, wherein, when the valid page count is greater than a map data count of a logical unit block selected among the plural logical unit blocks, the map data count of the selected logical unit block is subtracted from the valid page count, and data stored in the selected logical unit block is determined to be valid.

* * * * *